(12) United States Patent
Li et al.

(10) Patent No.: US 12,493,234 B2
(45) Date of Patent: Dec. 9, 2025

(54) LASER DEVICE AND LASER PROJECTION APPARATUS

(71) Applicant: Hisense Laser Display Co., Ltd, Qingdao (CN)

(72) Inventors: Jianjun Li, Qingdao (CN); Yongda Huang, Qingdao (CN); Xintuan Tian, Qingdao (CN); Boyu Zhou, Qingdao (CN)

(73) Assignee: Hisense Laser Display Co., Ltd, Qingdao (CN)

( * ) Notice: Subject to any disclaimer, the term of this patent is extended or adjusted under 35 U.S.C. 154(b) by 555 days.

(21) Appl. No.: 17/936,464

(22) Filed: Sep. 29, 2022

(65) Prior Publication Data

US 2023/0013971 A1 Jan. 19, 2023

Related U.S. Application Data

(63) Continuation of application No. PCT/CN2021/113764, filed on Aug. 20, 2021.

(30) Foreign Application Priority Data

Aug. 27, 2020 (CN) .......................... 202010878774.X
Aug. 27, 2020 (CN) .......................... 202010878802.8
Aug. 27, 2020 (CN) .......................... 202010880212.9

(51) Int. Cl.
*H01S 5/02208* (2021.01)
*G03B 21/20* (2006.01)
(Continued)

(52) U.S. Cl.
CPC ..... *G03B 21/2033* (2013.01); *G03B 21/2013* (2013.01); *H01S 5/02208* (2013.01); *H01S 5/02253* (2021.01); *H01S 5/4025* (2013.01)

(58) Field of Classification Search
CPC ............. H01S 5/02208; H01S 5/02253; H01S 5/4025; H01S 5/02216; H01S 5/02255;
(Continued)

(56) References Cited

U.S. PATENT DOCUMENTS 7,170,100 B2 1/2007 Erchak et al.
8,411,197 B2 4/2013 Watanabe et al.
(Continued)

FOREIGN PATENT DOCUMENTS

CN 1713214 A 12/2005
CN 101164170 A 4/2008
(Continued)

OTHER PUBLICATIONS

"International Application No. PCT/CN2021/113764, International Search Report and Written Opinion mailed Nov. 8, 2021", (Nov. 8, 2021), 14 pgs.
(Continued)

*Primary Examiner* — Magda Cruz
(74) *Attorney, Agent, or Firm* — Schwegman Lundberg & Woessner. P.A.

(57) ABSTRACT

A laser device is provided. The laser device includes a case, a plurality of light-emitting assemblies, an upper cover assembly and a stress-offsetting structure. The case includes a bottom plate and a frame body. The frame body is disposed on the bottom plate, and is enclosed on the bottom plate to form an accommodating space with an opening. The plurality of light-emitting assemblies is located in the accommodating space and are disposed on the bottom plate. The upper cover assembly is fixed to the case and covers the opening. The stress-offsetting structure is disposed in the frame body and/or in the upper cover assembly, and is configured to be contracted in a squeezing direction when the stress-offsetting structure is squeezed.

19 Claims, 9 Drawing Sheets

(51) Int. Cl.
    *H01S 5/02253*     (2021.01)
    *H01S 5/40*     (2006.01)

(58) Field of Classification Search
    CPC ............ H01S 5/02257; G03B 21/2013; G03B 21/2033; G03B 21/16
    USPC ............................................................. 353/94
    See application file for complete search history.

(56) References Cited

U.S. PATENT DOCUMENTS

| | | | |
|---|---|---|---|
| 9,455,160 | B2 | 9/2016 | Porwol et al. |
| 9,953,846 | B2 | 4/2018 | Porwol et al. |
| 10,267,483 | B2 | 4/2019 | Kiyota et al. |
| 10,483,133 | B2 | 11/2019 | Porwol et al. |
| 10,608,406 | B2 | 3/2020 | Hashimoto et al. |
| 2005/0275741 | A1 | 12/2005 | Watanabe et al. |
| 2006/0163587 | A1 | 7/2006 | Erchak et al. |
| 2009/0092168 | A1 | 4/2009 | Yamauchi et al. |
| 2014/0197551 | A1 | 7/2014 | Porwol et al. |
| 2016/0341395 | A1 | 11/2016 | Kiyota et al. |
| 2016/0379847 | A1 | 12/2016 | Porwol et al. |
| 2018/0182928 | A1 | 6/2018 | Namie |
| 2018/0226276 | A1 | 8/2018 | Porwol et al. |
| 2018/0287335 | A1 | 10/2018 | Kozuru et al. |
| 2019/0165542 | A1* | 5/2019 | Hashimoto ......... H01S 5/02257 |
| 2019/0203908 | A1 | 7/2019 | Kiyota et al. |
| 2020/0224826 | A1* | 7/2020 | Tian .................. G03B 21/2033 |
| 2020/0227880 | A1 | 7/2020 | Tian et al. |
| 2021/0180766 | A1 | 6/2021 | Kiyota et al. |
| 2021/0181614 | A1 | 6/2021 | Motobayashi et al. |

FOREIGN PATENT DOCUMENTS

| | | |
|---|---|---|
| CN | 101404383 A | 4/2009 |
| CN | 102941411 | 2/2013 |
| CN | 103928352 A | 7/2014 |
| CN | 205335610 | 6/2016 |
| CN | 106168333 A | 11/2016 |
| CN | 111427225 A | 7/2020 |
| CN | 113422287 A | 9/2021 |
| CN | 113451875 A | 9/2021 |
| JP | 2005235850 A | 9/2005 |
| JP | 2011129591 A | 6/2011 |
| WO | WO-2020036053 A1 | 2/2020 |
| WO | WO-2022042441 A1 | 3/2022 |

OTHER PUBLICATIONS

"Chinese Application Serial No. 202010878802.8, Office Action mailed Mar. 1, 2024", with English translation, 15 pgs.

"Chinese Application No. 202010880212.9, Office Action dated Feb. 28, 2025", w English Translation, (Nov. 28, 2025), 13 pgs.

"Chinese Application No. 202010878774.X. Office Action dated Mar. 1, 2025", w English Translation, (Mar. 1, 2025), 13 pgs.

\* cited by examiner

LASER DEVICE AND LASER PROJECTION APPARATUS

CROSS-REFERENCE TO RELATED APPLICATIONS

This application is a continuation application of International Patent Application No. PCT/CN2021/113764, filed on Aug. 20, 2021, which claims priorities to Chinese Patent Application No. 202010878802.8, filed on Aug. 27, 2020, and Chinese Patent Application No. 202010880212.9, filed on Aug. 27, 2020, and Chinese Patent Application No. 202010878774.X, filed on Aug. 27, 2020, which are incorporated herein by reference in their entireties.

TECHNICAL FIELD

The present disclosure relates to the field of laser display, and in particular, to a laser device and a laser projection apparatus.

BACKGROUND

Laser devices are widely used with the development of laser display technologies. Laser devices are being used in more and more fields due to the purity and spectral stability of the light emitted thereby. For example, a laser device may be used in a laser projection apparatus, which is a projection display apparatus that adopts a laser source as a display light source and cooperates with projection display technologies to form an image.

SUMMARY

In an aspect, some embodiments of the present disclosure provide a laser device. The laser device includes a case, a plurality of light-emitting assemblies, an upper cover assembly and a stress-offsetting structure. The case includes a bottom plate and a frame body. The frame body is disposed on the bottom plate, and is enclosed on the bottom plate to form an accommodating space with an opening. The plurality of light-emitting assemblies are located in the accommodating space and are disposed on the bottom plate. The upper cover assembly is fixed to the case and covers the opening. The stress-offsetting structure is disposed in the frame body and/or in the upper cover assembly, and is configured to be contracted in a squeezing direction when the stress-offsetting structure is squeezed.

In another aspect, some embodiments of the present disclosure provide a laser projection apparatus. The laser projection apparatus includes a laser source, an optical engine and a projection lens. The laser source includes the laser device as described above, and the laser source is configured to emit illumination beams; the optical engine is configured to modulate the illumination beams emitted by the laser source to obtain projection beams; the projection lens is configured to project the projection beams into an image.

DETAILED DESCRIPTION

Figure 1:
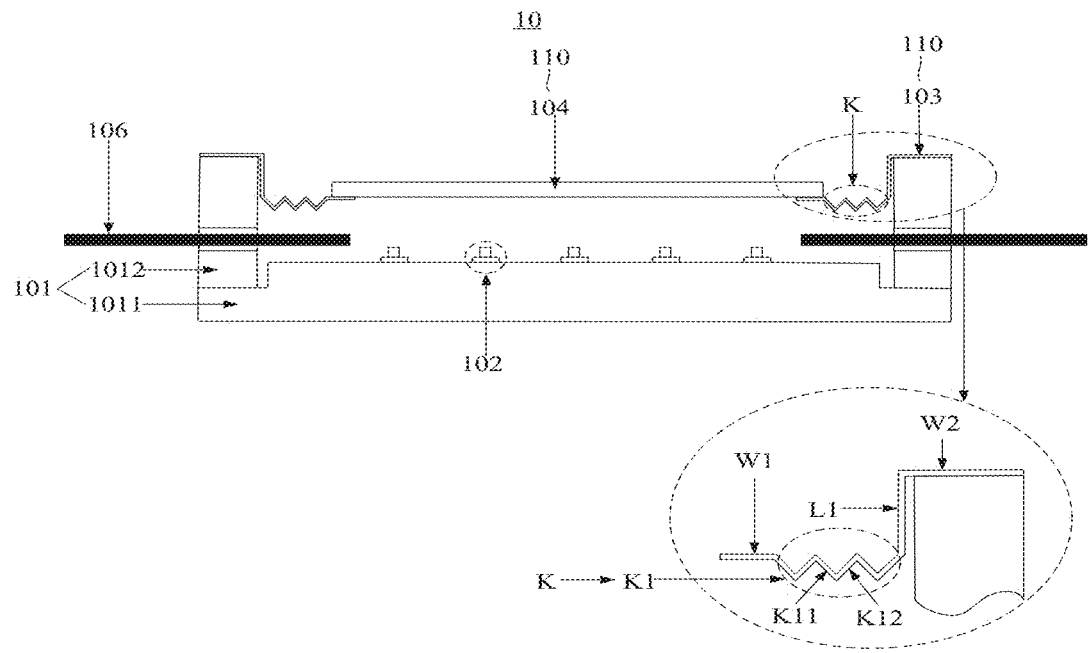
FIG. 1 is a structural diagram of a laser device, in accordance with some embodiments.

Technical solutions in some embodiments of the present disclosure will be described clearly and completely with reference to accompanying drawings below. Obviously, the described embodiments are merely some but not all embodiments of the present disclosure. All other embodiments obtained by a person having ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed in an open and inclusive sense, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or examples(s). In addition, the specific features, structures, materials, or characteristics described herein may be included in any one or more embodiments or examples in any suitable manner.

Hereinafter, the terms "first" and "second" are used for descriptive purposes only, and are not to be construed as indicating or implying a relative importance or implicitly indicating a number of indicated technical features. Therefore, the features defined with "first" and "second" may explicitly or implicitly include one or more of these features. In the description of the embodiments of the present disclosure, the terms "a plurality of", "the plurality of" and "multiple" each mean two or more unless otherwise specified.

In the description of the embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. The term "coupled" or "communicatively coupled", however, may also mean that two or more components are not in direct contact with each other, but still cooperate or interact with each other. The embodiments disclosed herein are not necessarily limited to the content herein.

The phrase "A and/or B" includes the following three combinations: only A, only B, and a combination of A and B.

The phrase "at least one of A, B and C" has the same meaning as the phrase "at least one of A, B or C", and both include following combinations of A, B and C: only A, only B, only C, a combination of A and B, a combination of A and C, a combination of B and C, and a combination of A, B and C.

The terms such as "about", "substantially", or "approximately" as used herein include a stated value and an average value within an acceptable range of deviation of a particular value determined by a person of ordinary skill in the art, considering measurement in question and errors associated with measurement of a particular quantity (i.e., limitations of a measurement system).

As used herein, the terms such as "parallel", "perpendicular" and "equal" include the stated conditions and the conditions similar to the stated conditions, and the range of the similar conditions is within the acceptable deviation range, where the acceptable deviation range is determined by a person of ordinary skill in the art in consideration of the measurement in question and the error associated with the measurement of a specific quantity (i.e., the limitation of the measurement system). For example, the term "parallel" includes absolute parallelism and approximate parallelism, and an acceptable range of deviation of the approximate parallelism may be, for example, a deviation within 5°; the term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, a difference between two equals of less than or equal to 5% of either of the two equals.

Exemplary embodiments are described herein with reference to sectional views and/or plan views that are schematic illustrations of idealized embodiments. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. Thus, the regions shown in the accompanying drawings are schematic in nature, and their shapes are not intended to show actual shapes of regions in a device, and are not intended to limit the scope of the exemplary embodiments.

Figure 12:
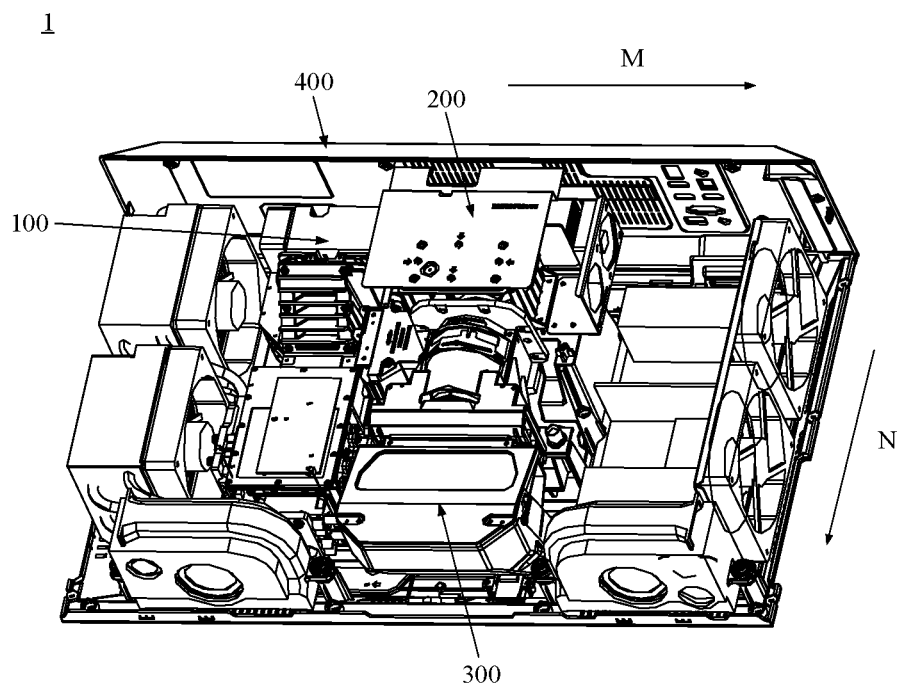
FIG. 12 is a structural diagram of a laser projection apparatus, in accordance with some embodiments.

Some embodiments of the present disclosure provide a laser projection apparatus 1. As shown in FIG. 12, the laser projection apparatus 1 includes a housing 400 (only part of the housing is shown in FIG. 12), and a laser source 100, an optical engine 200 and a projection lens 300 that are assembled in the housing 400. The laser source 100 is configured to provide illumination beams (laser beams). The optical engine 200 is configured to modulate the illumination beams provided by the laser source 100 with image signals to obtain projection beams. The projection lens 300 is configured to project the projection beams into an image on a projection screen.

The laser source 100, the optical engine 200 and the projection lens 300 are connected in sequence in a propagation direction of laser beams, and are each wrapped by a corresponding shell. The laser source 100, the optical engine 200 and the projection lens 300 are supported by the corresponding shell, so as to enable these optical components to meet certain sealing or airtight requirements. For example, the laser source 100 is hermetically sealed through its shell, which may well solve a light attenuation problem of the laser source 100.

In some embodiments, an end of the optical engine 200 is connected to the laser source 100, and the other end thereof is connected to the projection lens 300. The laser source 100 and the optical engine 200 are arranged in an exit direction (referring to the direction M shown in FIG. 12) of the illumination beams of the laser projection apparatus 1, and the optical engine 200 and the projection lens 300 are arranged in an exit direction (referring to the direction N as shown in FIG. 12) of the projection beams of the laser projection apparatus 1, the direction M is substantially perpendicular to the direction N. On one hand, such a connection structure may adapt to characteristics of an optical path of a reflective light valve in the optical engine 200; on another hand, it is also beneficial to shorten a length of an optical path in a one-dimension direction, which is in turn conducive to a structural arrangement of a projection host. For example, in a case where the laser source 100, the optical engine 200 and the projection lens 300 are arranged in a one-dimension direction (e.g., the direction M), a length of an optical path in the direction is relatively long, which is not conducive to the structural arrangement of the projection host.

In some embodiments, the laser source 100 can provide laser beams of three primary colors sequentially (laser beams of other color may also be added on the basis of the laser beams of three primary colors). Due to persistence of vision of human eyes, the laser beams observed by the human eyes are white laser beams formed by a mixture of the laser beams of three primary colors. The laser source 100 can also simultaneously output the laser beams of three primary colors, and continuously emit the white laser beams. The laser source 100 includes a laser device 10 (as shown in FIGS. 1 to 6, 9 to 11 and 13); the laser device 10 can emit laser beams of a single color, such as a red laser beam, a blue laser beam or a green laser beam; or, the laser device 10 can emit laser beams of various colors, for example, the laser device 10 emits the red laser beam, the blue laser beam and the green laser beam simultaneously or sequentially.

Figure 13:
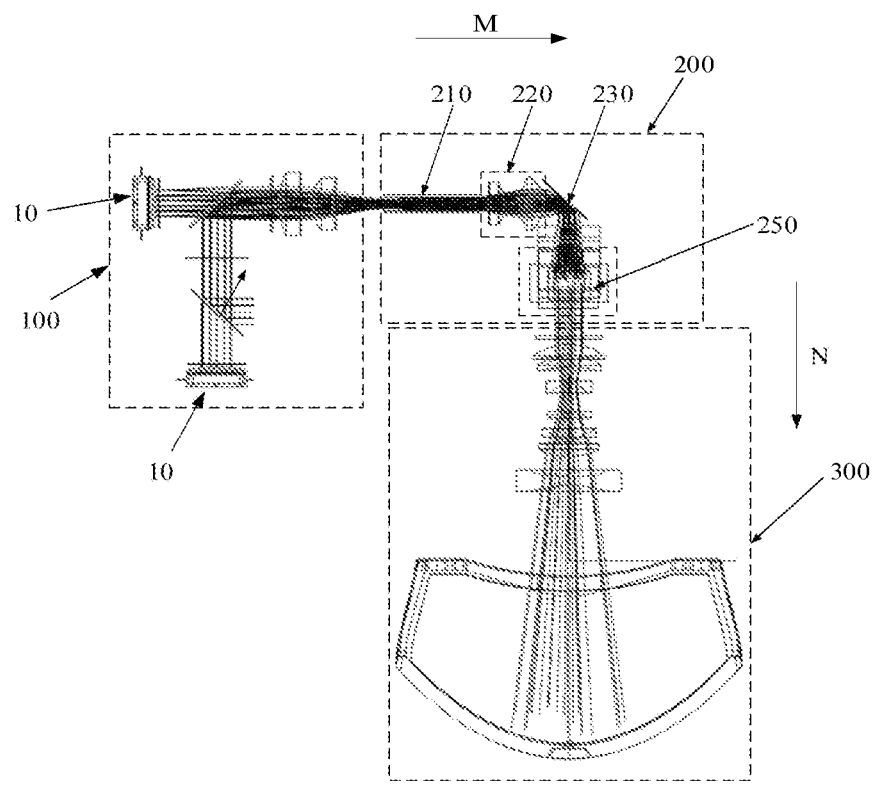
FIG. 13 is a diagram showing an optical path of a laser source, an optical engine and a projection lens in a laser projection apparatus, in accordance with some embodiments.
Figure 14:
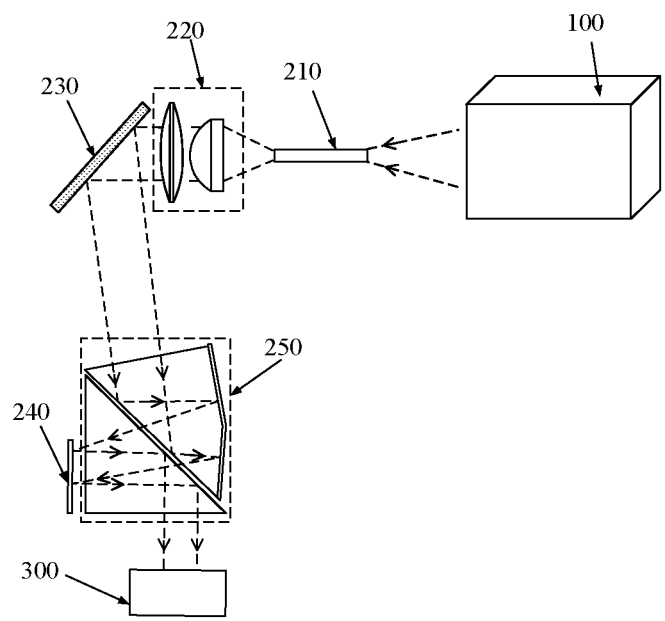
FIG. 14 is a diagram showing another optical path of a laser source, an optical engine and a projection lens in a laser projection apparatus, in accordance with some embodiments.

The illumination beams emitted by the laser source 100 enter the optical engine 200. Referring to FIGS. 13 and 14, the optical engine 200 includes a light pipe 210, a lens assembly 220, a reflector 230, a digital micromirror device (DMD) 240 and a prism assembly 250. The light pipe 210 may receive the illumination beams provided by the laser source 100 and homogenize the illumination beams. The lens assembly 220 may first collimate the illumination beams, and then converge the collimated illumination beams and emit the converged illumination beams to the reflector 230. The reflector 230 may reflect the illumination beams to the prism assembly 250. The prism assembly 250 reflects the illumination beams to the DMD 240, and the DMD 240 modulates the illumination beams to obtain the projection beams, and reflects the projection beams into the projection lens 300.

A function of the DMD 240 is to modulate the illumination beams provided by the laser source 100 with image signals, that is, to control the illumination beams to display different luminance according to different pixels of an image to be displayed, so as to finally form an optical image. Therefore, the DMD 240 is also referred to as an optical modulator or a light valve. Depending on whether the optical modulator transmits or reflects the illumination beams, the optical modulator may be classified as a transmissive optical modulator or a reflective optical modulator. For example, the DMD 240 shown in FIG. 14 reflects the illumination beams, thus it is a reflective optical modulator. A liquid crystal light valve transmits the illumination beams, thus it is a transmissive optical modulator.

Figure 15:
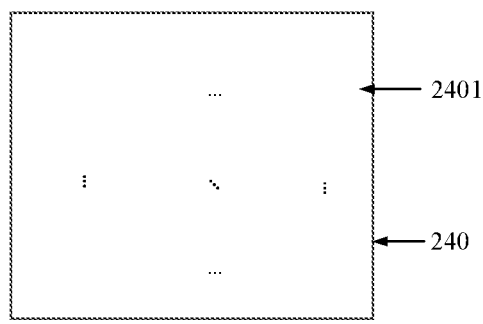
FIG. 15 is a diagram showing an arrangement of micromirrors in a digital micromirror device, in accordance with some embodiments.
Figure 16:
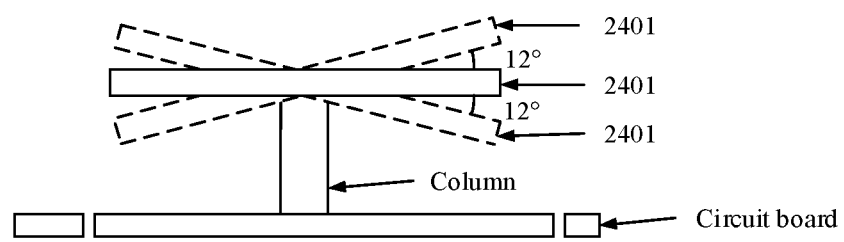
FIG. 16 is a diagram showing a swing position of a micromirror in the digital micromirror device shown in FIG. 15.

As shown in FIG. 15, the DMD 240 includes thousands of micromirrors 2401 that may be individually driven to rotate; these micromirrors 2401 are arranged in an array, and each micromirror 2401 corresponds to one pixel in the image to be displayed. As shown in FIG. 16, each micromirror 2401 is equivalent to a digital switch, and may swing in a range of plus or minus 12 degrees (i.e., ±12°) or a range of plus or minus 17 degrees (i.e., ±17°) due to an action of an external force.

Figure 17:
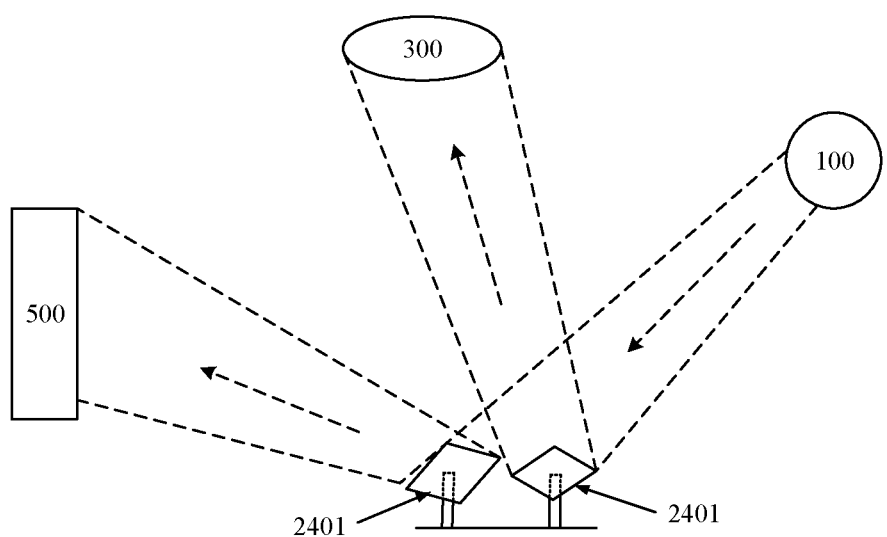
FIG. 17 is a schematic diagram showing an operation of a micromirror, in accordance with some embodiments.

As shown in FIG. 17, a beam reflected by a micromirror 2401 at a negative deflection angle is referred to as an OFF beam, which is an invalid beam, and usually irradiates on the shell of the optical engine 200 or is absorbed by a laser absorption unit 500. A beam reflected by a micromirror 2401 at a positive deflection angle is referred to as an ON beam, which is a valid beam reflected into the projection lens 300 after the micromirror 2401 on a surface of the DMD 240 is irradiated by an illumination beam, and is used for projecting into an image. An ON state of the micromirror 2401 is a state that the micromirror 2401 is in and may be maintained when the illumination beams emitted by the laser source 100 may enter the projection lens 300 after being reflected by the micromirror 2401. That is, the micromirror 2401 is in a state of a positive deflection angle. An OFF state of the micromirror 2401 is a state that the micromirror 2401 is in and may be maintained when the illumination beams emitted by the laser source 100 do not enter the projection lens 300 after being reflected by the micromirror 2401. That is, the micromirror 2401 is in a state of a negative deflection angle.

In a display cycle of a frame of image, part or all of the micromirrors 2401 may be switched once between the ON state and the OFF state, so that gray scales of pixels in the frame of image are achieved according to durations that the micromirrors 2401 are in the ON state and the OFF state, respectively. By controlling a state of each micromirror in the DMD 240 and a duration of each state in the display cycle of the frame of image through the image signals, it may be possible to control luminance (the gray scale) of a pixel corresponding to the micromirror 2401, and achieve a purpose of modulating the illumination beams projected onto the DMD 240.

As shown in FIGS. 13 and 14, the light pipe 210, the lens assembly 220 and the reflector 230 in front of the DMD 240 form an illumination path. After passing through the illumination path, the illumination beams emitted by the laser source 100 have a beam size and an incident angle in line with the requirements of the DMD 240.

As shown in FIG. 13, the projection lens 300 includes a combination of a plurality of lenses. The projection lens 300 may be a zoom lens, or a fixed focus-adjustable lens, or a fixed focus lens.

Figure 2:
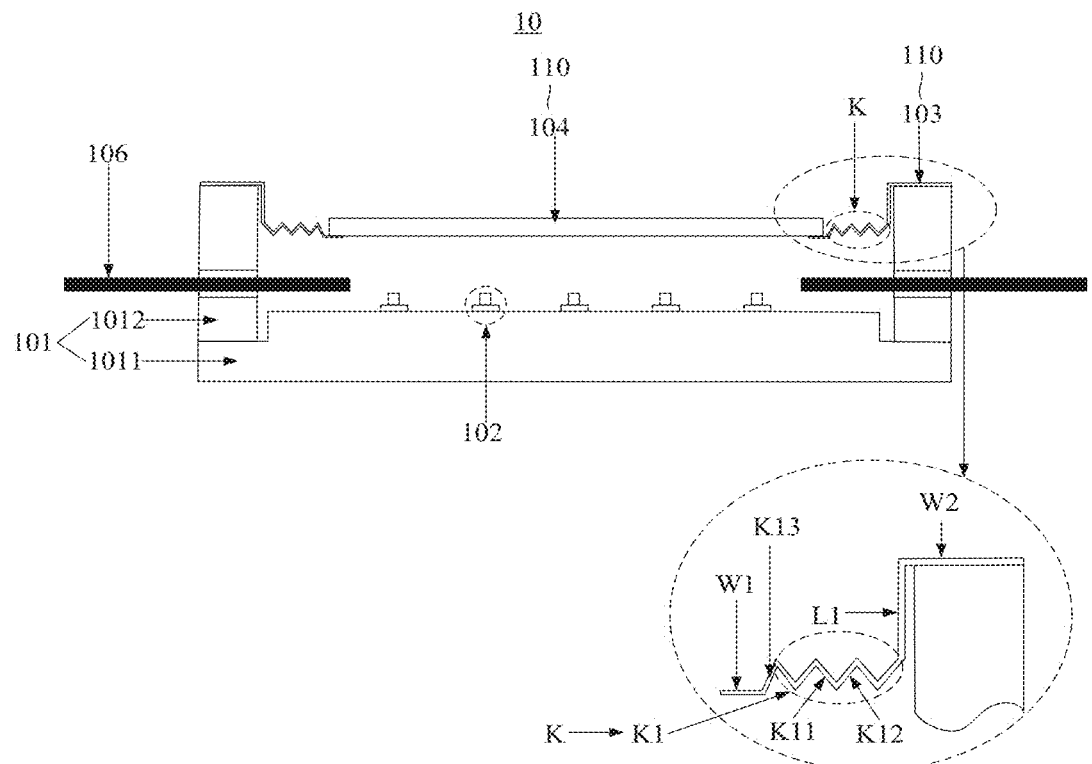
FIG. 2 is a structural diagram of another laser device, in accordance with some embodiments.
Figure 7:
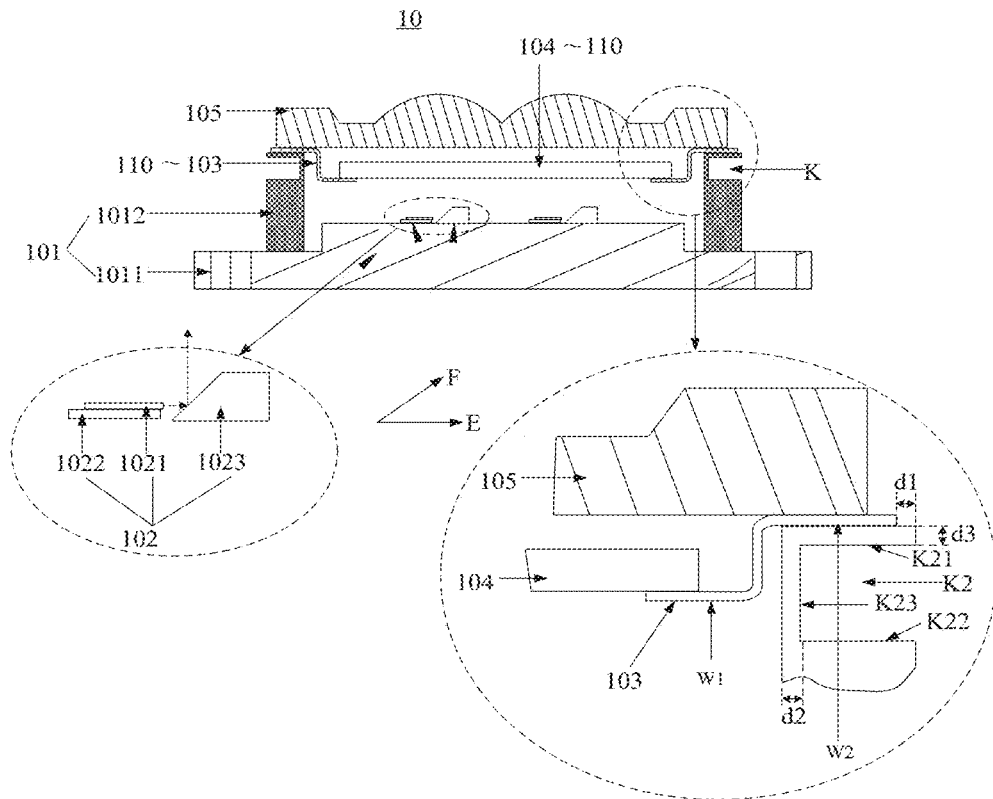
FIG. 7 is a structural diagram of yet another laser device, in accordance with some embodiments.
Figure 8:
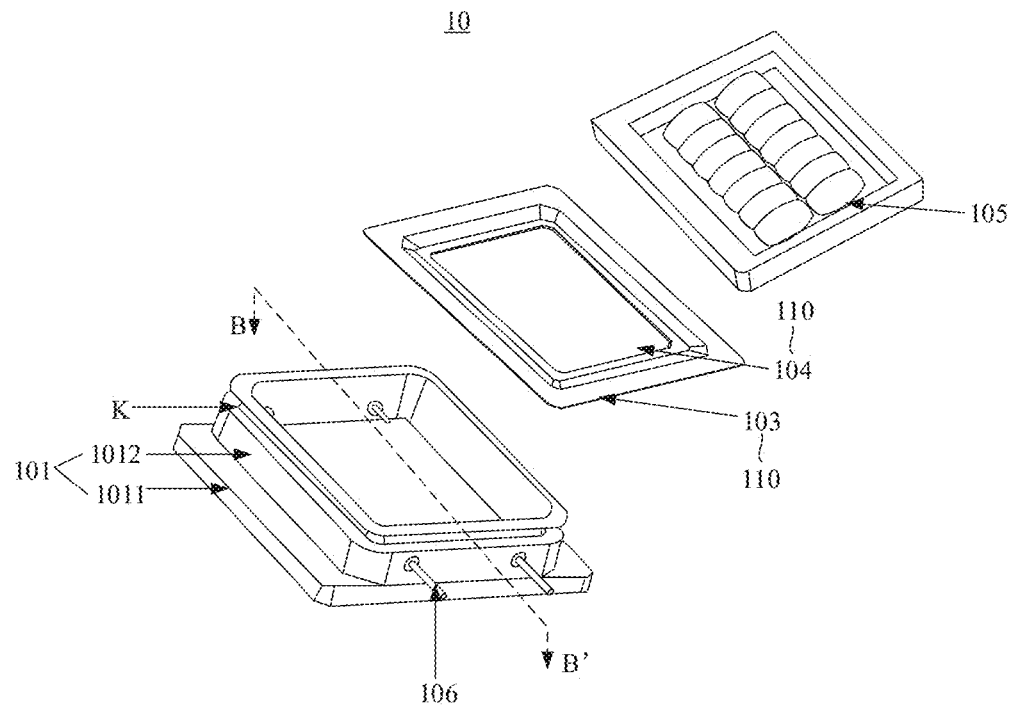
FIG. 8 is an exploded view of the laser device shown in FIG. 7.

The laser device 10 in the laser source 100 in some embodiments of the present disclosure will be described in detail below. FIG. 1 is a structural diagram of a laser device, in accordance with some embodiments, and FIG. 2 is a structural diagram of another laser device, in accordance with some embodiments, and FIG. 7 is a structural diagram of yet another laser device, in accordance with some embodiments, and FIG. 8 is an exploded view of the laser device shown in FIG. 7. As shown in FIGS. 1, 2, 7 and 8, the laser device 10 includes a case 101, a plurality of light-emitting assemblies 102, an upper cover assembly 110, which includes a cover plate 103 and a light-transmissive layer 104, a collimating lens group 105 (referring to FIG. 8), conductive pins 106 (referring to FIG. 8) and a stress-offsetting structure K. The case 101 has an opening facing the cover plate 103 and has an accommodating space. The plurality of light-emitting assemblies 102 are all located in the accommodating space of the case 101. An outer edge of the cover plate 103 is fixed to a side of the case 101 where the opening is located, and an inner edge of the cover plate 103 is fixed to the light-transmissive layer 104. The collimating lens group 105 is located on a side of the cover plate 103 away from the case 101, and is fixed to the outer edge of the cover plate 103. The conductive pins 106 extend into the case 101, and are fixed to the case 101.

In the laser device 10 of some embodiments of the present disclosure, the conductive pins 106 are electrically connected to the light-emitting assemblies 102 in the case 101, so as to transmit external power to the light-emitting assemblies 102, thereby exciting the light-emitting assemblies 102 to emit laser beams. The laser beams exit through the light-transmissive layer 104, so as to realize emission of the laser device 10.

In the laser device 10 of some embodiments of the present disclosure, the stress-offsetting structure K is disposed in the cover plate 103 (for example, as shown in FIG. 1 or FIG. 2, the stress-offsetting structure K is disposed in the middle of the cover plate 103) or in the case 101 (for example, as shown in FIG. 7 or FIG. 8, the stress-offsetting structure K is disposed on the side of the case 101 where the opening is located), and the stress-offsetting structure K is configured to absorb the stress generated by the thermal expansion of the case 101 and/or the cover plate 103.

It will be noted that, in some embodiments, the laser device includes a plurality of stress-offsetting structures K, and the plurality of stress-offsetting structures K include a first stress-offsetting structure K1 and a second stress-offsetting structure K2. The first stress-offsetting structure K1 is disposed in the cover plate 103, and the second stress-offsetting structure K2 is disposed in the case 101. In a case where the case 101 and/or the cover plate 103 is thermally expanded and generates stress, and the stress is transmitted to the cover plate 103, the first stress-offsetting structure K1 is compressively deformed to absorb or partially absorb the stress; in a case where the stress is transmitted to the case 101, the second stress-offsetting structure K2 is compressively deformed to absorb or partially absorb the stress, thereby further improving the stress absorption effect.

The laser device 10 in which the stress-offsetting structure K is disposed in the cover plate 103 will be described in detail below with reference to the accompanying drawings.

As shown in FIGS. 1 and 2, in some embodiments, the case 101 includes a bottom plate 1011 and an annular frame body 1012 fixed on the bottom plate 1011. The bottom plate 1011 is configured to support the plurality of light-emitting assemblies 102 and the frame body 1012; a surface of the bottom plate 1011 supporting the plurality of light-emitting assemblies 102 and the frame body 1012 is an inner surface, and a surface of the bottom plate 1011 opposite to the inner surface is an outer surface. The frame body 1012 is configured to support the cover plate 103; a surface of the frame body 1012 supporting the cover plate 103 is an outer annular surface, and a surface of the frame body 1012 opposite to the outer annular surface is an inner annular surface. The inner annular surface of the frame body 1012 is fixed to the bottom plate 1011, so that the frame body 1012 is enclosed on the bottom plate 1011 and forms the accommodating space of the case 101. The outer annular surface of the frame body 1012 defines the opening of the case 101.

The case 101 is made of a material with a large thermal conductivity, such as oxygen-free copper, so that the heat generated by the plurality of light-emitting assemblies 102 disposed on the bottom plate 1011 during operation may be quickly conducted to a heat dissipation structure outside the laser device 10, thereby dissipating heat quickly and avoiding a damage to the light-emitting assembly 102 caused by heat accumulation. In addition to oxygen-free copper, the material of the case 101 may also be one or more of aluminum, aluminum nitride and silicon carbide.

In some embodiments, the plurality of light-emitting assemblies 102 in the laser device 10 include a plurality of rows and a plurality of columns of light-emitting chips arranged in an array on the bottom plate 1011.

As shown in FIGS. 1 and 2, the cover plate 103 is loop-shaped, and the cover plate 103 includes an inner edge portion W1 and an outer edge portion W2. The inner edge portion W1 is fixed to the light-transmissive layer 104, and the outer edge portion W2 is fixed to the case 101.

In some embodiments, a thickness of the outer edge portion W2 of the cover plate 103 is relatively small, and the outer edge portion W2 is fixed on the case 101. For example, the outer edge portion W2 is fixed to the outer annular surface of the frame body 1012 in the case 101 by a parallel sealing technology.

In some embodiments, the outer edge portion W2 is in a shape of an annular plate, and a width of the outer edge portion W2 is greater than a width of the outer annular surface of the frame body 1012 in the case 101. It will be noted that, a width of any annular structure described in some embodiments of the present disclosure refers to a difference between an outer radius and an inner radius of the annular structure.

In some embodiments, an edge of the outer edge portion W2 is flush with an edge of the outer annular surface of the frame body 1012 (as shown in FIG. 1). In some embodiments, the edge of the outer edge portion W2 is retracted relative to the edge of the outer annular surface (as shown in FIG. 7). A surface in contact with objects to be welded together in a sealing device is an inclined surface. In a case where the edge of the outer edge portion W2 is retracted relative to the edge of the outer annular surface, the inclined surface of the sealing device may simultaneously contact the outer edge portion W2 and the outer annular surface of the frame body 1012, so that it is possible to make the outer edge portion W2 and the frame body 1012 both melted and improve an effect of parallel sealing.

Regardless of whether the edge of the outer edge portion W2 is retracted too much or too little relative to the edge of the outer annular surface, it is difficult to ensure that the inclined surface of the sealing device can simultaneously contact the outer edge portion W2 and the outer annular surface of the frame body 1012. For example, a distance d1 (referring to FIG. 7) between the edge of the outer edge portion W2 and the edge of the outer annular surface is less than or equal to 0.1 mm and is greater than or equal to 0. For example, the distance d1 is 0.01 mm, 0.02 mm, 0.03 mm, 0.04 mm, 0.05 mm, 0.06 mm, 0.07 mm, 0.08 mm or 0.95 mm.

In some embodiments, the stress-offsetting structure K includes a first stress-offsetting structure K1, and the first stress-offsetting structure K1 is disposed in the middle of the cover plate 103, and connects the inner edge portion W1 and the outer edge portion W2.

In some embodiments, the first stress-offsetting structure K1 includes a plurality of first stress-offsetting sub-structures that are connected in sequence. As shown in FIGS. 1 and 2, a first stress-offsetting sub-structure includes a first plate K11 and a second plate K12, and a side edge of the first plate K11 is fixed to a side edge of the second plate K12, and an included angle is formed at a position where the first plate K11 is fixed to the second plate K12. The included angle may be an acute angle, an obtuse angle or an angle of 90 degrees (90°).

When being squeezed, the first stress-offsetting structure K1 may be contracted in a squeezing direction, so as to absorb the stress; when not being squeezed, the first stress-offsetting structure K1 may return to an original shape, so as to release the stress.

Therefore, in a case where the case 101 and/or the cover plate 103 is thermally expanded and generates stress, and the stress is transmitted to the cover plate 103, each first stress-offsetting sub-structure in the first stress-offsetting structure K1 may be compressively deformed to absorb or partially absorb the stress; in a case where the case 101 and/or the cover plate 103 cools, each first stress-offsetting sub-structure may return to the original shape to release the stress.

It will be noted that, each first stress-offsetting sub-structure in the first stress-offsetting structure K1 may be the same or may be different. For example, in two first stress-offsetting sub-structures of the first stress-offsetting structure K1, dimensions of the first plate K11 and the second plate K12 of one first stress-offsetting sub-structure are greater than dimensions of the first plate K11 and the second plate K12 of the other first stress-offsetting sub-structure; or, an included angle between the first plate K11 and the second plate K12 of one first stress-offsetting sub-structure is greater than an included angle between the first plate K11 and the second plate K12 of the other first stress-offsetting sub-structure. Similarly, in each first stress-offsetting sub-structure, the dimensions of the first plate K11 and the second plate K12 may also be different. In this way, the manufacturing difficulty of the first stress-offsetting structure K1 may be reduced, and the manufacturing difficulty of the cover plate 103 may also be reduced.

As shown in FIGS. 1 and 2, the first stress-offsetting structure K1 and the inner edge portion W1 in the cover plate 103 are recessed in a direction proximate to the bottom plate 1011 relative to the outer edge portion W2, that is, a distance between the first stress-offsetting structure K1 and the bottom plate 1011 is less than a distance between the outer edge portion W2 and the bottom plate 1011, and a distance between the inner edge portion W1 and the bottom plate 1011 is also less than the distance between the outer edge portion W2 and the bottom plate 1011.

In a case where the cover plate 103 and the case 101 are fixed by the parallel sealing technology, after the cover plate 103 is placed on the case 101, the sealing device similar to a roller may be used to roll on the outer edge portion W2 of the cover plate 103. Since the first stress-offsetting structure K1 and the inner edge portion W1 are recessed in the direction proximate to the bottom plate 1011 relative to the outer edge portion W2, the sealing device may be prevented from contacting the first stress-offsetting structure K1 and the inner edge portion W1 during rolling.

As shown in FIG. 2, the inner edge portion W1 of the cover plate 103 is recessed in the direction proximate to the bottom plate 1011 relative to the first stress-offsetting structure K1. In this case, the first stress-offsetting structure K1 further includes a third plate K13. A side edge of the third plate K13 is connected to the first plate K11 in the first stress-offsetting sub-structure closest to the inner edge portion W1, and the other opposite side edge of the third plate K13 is connected to the inner edge portion W1.

When the cover plate 103 is fixed to the light-transmissive layer 104, the inner edge portion W1 of the cover plate 103 needs to be coated with an adhesive first, then the light-transmissive layer 104 covers the inner edge portion W1, and an edge of the light-transmissive layer 104 is in close contact with the adhesive. Since the inner edge portion W1 is recessed in the direction proximate to the bottom plate 1011 relative to the first stress-offsetting structure K1, a height difference between the first stress-offsetting structure K1 and the inner edge portion W1 may make the adhesive located only on the inner edge portion W1, and the adhesive is prevented from being flown to the first stress-offsetting structure K1, thereby avoiding affecting a squeezing deformation effect of the first stress-offsetting structure K1.

However, it is not limited to this. As shown in FIG. 1, the inner edge portion W1 of the cover plate 103 may also be directly connected to the first plate K11 of the first stress-offsetting sub-structure closest to the inner edge portion W1.

As shown in FIGS. 1 and 2, the cover plate 103 further includes a first connection portion L1 used to connect the first stress-offsetting structure K1 and the outer edge portion W2. The first connection portion L1 is in a shape of a plate, and the first connection portion L1 is perpendicular to the inner edge portion W1 and the outer edge portion W2.

In some embodiments, the first stress-offsetting structure K1 in the cover plate 103 is directly connected to the outer edge portion W2, and the first stress-offsetting structure K1 is used to connect the outer edge portion W2 and the inner edge portion W1.

In the laser device 10 provided by some embodiments of the present disclosure, since the first stress-offsetting structure K1 of the cover plate 103 includes three first stress stress-offsetting sub-structures, the first stress-offsetting structure K1 has a plurality of bending positions. Under an action of the heat generated by the parallel sealing, the first stress-offsetting structure K1 may be deformed to a certain extent at each bending position, so as to absorb the stress generated by the cover plate 103 and the case 101 due to the heat, thereby reducing the stress transmitted to the light-transmissive layer 104 and reducing a risk that the light-transmitting layer 104 is broken or fallen off during the parallel sealing process.

When the cover plate 103 is not heated, a temperature of the case 101 and the cover plate 103 drops, and the first stress-offsetting structure K1 returns to an original shape (i.e., a shape when the first stress-offsetting structure K1 is not squeezed).

In addition, the light-emitting assembly 102 may generate a large amount of heat during operation, and the heat will be conducted to the bottom plate 1011 and then conducted to the cover plate 103 through the frame body 1012. In this case, the effect of the heat on the cover plate 103 and the case 101 is the same as the effect of the heat generated by the parallel sealing on the cover plate 103 and the case 101.

When the light-emitting assembly 102 is in operation, the first stress-offsetting structure K1 may also absorb the stress at each bending position generated when the case 101 and the cover plate 103 are thermally expanded, thereby further reducing a risk that the light-transmitting layer 104 and the collimating lens group 105 are broken or fallen off. Under the action of the heat, the first stress-offsetting structure K1 will be compressively deformed to a certain extent to absorb the stress. After the light-emitting assembly 102 stops operation and the temperature drops, the first stress-offsetting structure K1 will return to the original shape to release the stress.

In addition, in the laser device 10 provided by some embodiments of the present disclosure, even if the first stress-offsetting structure K1 is thermally expanded, the first stress-offsetting structure K1 may be deformed at each bending position, it is possible to reduce a deformation amount of the first stress-offsetting structure K1 relative to the light-transmissive layer 104. In addition, due to a large unwrapped area of the first stress-offsetting structure K1, the heat on the cover plate 103 may be largely absorbed and dissipated by the first stress-offsetting structure K1, so as to reduce the heat conducted to the light-transmissive layer 104, thereby reducing a deformation amount when the light-transmissive layer 104 is thermally expanded, and further reducing a risk that the light-transmitting layer 104 is broken or fallen off the cover plate 103.

In addition, since the first stress-offsetting structure K1 may absorb a large amount of stress, a limit value of the force applied on the cover plate 103 may also be increased, the adaptability of the cover plate 103 and the light-transmissive layer 104 to a parallel sealing temperature may be enhanced, and requirements on manufacturing conditions of the laser device 10 may be reduced. Moreover, requirements on an operation environment may be reduced, and a scope of the application of the laser device 10 may be expanded.

In some embodiments, a thickness of the cover plate 103 at each position is the same or substantially the same. For example, thicknesses of the inner edge portion W1, the outer edge portion W2 and the first stress-offsetting structure K1 in the cover plate 103 are substantially the same at each position, thus it is beneficial to uniformly dissipate the heat and avoiding stress concentration caused by heat concentration.

In some embodiments, the cover plate 103 is formed through a sheet metal process. For example, a plate is stamped, so that the plate has bends, depressions or protrusions to obtain the cover plate 103. The sheet metal process has a low cost, and a manufacturing cost of the laser device 10 may be reduced. In addition, in a case where the thickness of the cover plate 103 at each position is the same or substantially the same, it is beneficial to manufacture the cover plate 103 through the sheet metal process.

As shown in FIGS. 1 and 2, the light-transmissive layer 104 is in a shape of a plate. The light-transmissive layer 104 includes two large surfaces in parallel and a plurality of small side surfaces connecting the two large surfaces. An edge of the light-transmissive layer 104 is fixed to the inner edge portion W1 of the cover plate 103 through an adhesive.

In some embodiments, before the cover plate 103 is fixed to the case 101, the light-transmissive layer 104 is fixed to the cover plate 103 first. For example, the edge of the light-transmissive layer 104 is fixed to the inner edge portion W1 of the cover plate 103 through the adhesive. The adhesive covers the plurality of side surfaces of the light-transmissive layer 104 to improve the sticking reliability of the light-transmissive layer.

In some embodiments, the laser device 10 further includes a support frame, and the support frame is fixed to the cover plate 103. The light-transmissive layer 104 is fixed to the support frame first, and then the support frame is fixed to the cover plate 103. For example, the support frame is a rectangular frame, and one or more support rods are provided between two opposite sides of the rectangular frame, and the one or more support rods are parallel to the two opposite sides, and a middle region of the light-transmissive layer 104 may be supported by the support frame, so as to improve the setting firmness of the light-transmissive layer.

In some embodiments, a brightness enhancement film is attached to at least one of a surface of the light-transmissive layer 104 proximate to the bottom plate and a surface of the light-transmissive layer 104 away from the bottom plate, so as to improve light-emitting brightness of the laser device 10.

In the laser device 10 provided by some embodiments of the present disclosure, the case 101, the cover plate 103 and the light-transmissive layer 104 constitute a closed space, and the plurality of light-emitting assemblies 102 are located in the closed space to prevent water and oxygen from corroding the plurality of light-emitting assemblies, so as to improve the reliability of the plurality of light-emitting assemblies 102. Moreover, through this arrangement, it is possible to reduce a risk that the light-transmissive layer 104 is broken due to the heat generated by the plurality of light-emitting assemblies 102 during operation, thereby improving a sealing effect of the closed space, and prolonging the service life of the light-emitting assemblies 102.

In some embodiments, the case 101 is made of oxygen-free copper, and the cover plate 103 is made of stainless steel, and the light-transmissive layer 104 is made of glass. Since a thermal expansion coefficient of stainless steel is greater than a thermal expansion coefficient of glass and is less than a thermal expansion coefficient of oxygen-free copper, a difference of thermal expansion coefficient between connecting components is small, which may appropriately reduce the stress transmitted to the cover plate 103 and the light-transmissive layer 104 as the case 101 is thermally expanded, and further improve the production yield of the laser device.

It will be noted that, in some embodiments, the bottom plate 1011 and the frame body 1012 are integrally formed, so as to prevent the bottom plate 1011 from being wrinkled due to the difference of thermal expansion coefficients between the bottom plate 1011 and the frame body 1012 during a high-temperature welding, improve the flatness of the bottom plate 1011 and the reliability of the light-emitting assembly 102 setting on the bottom plate 1011, so that the laser beam emitted by the light-emitting chip 1021 (as shown in FIG. 7) may be emitted according to a predetermined light-emitting angle, thereby improving a light-emitting effect of the laser device 10.

In some embodiments, as shown in FIGS. 1 and 2, the laser device 10 further includes a plurality of conductive pins 106 electrically connected to the light-emitting assemblies 102. A plurality of holes are provided on two opposite sides of the frame body 1012 in the case 101, and the conductive pin 106 passes through the hole in the frame body 1012 and extends into the case 101 to be fixed to the case 101, and is electrically connected to the light-emitting assembly 102 in the case 101, so as to transmit external power to the light-emitting assembly 102, thereby exciting the light-emitting assembly 102 to emit a laser beam.

Figure 3:
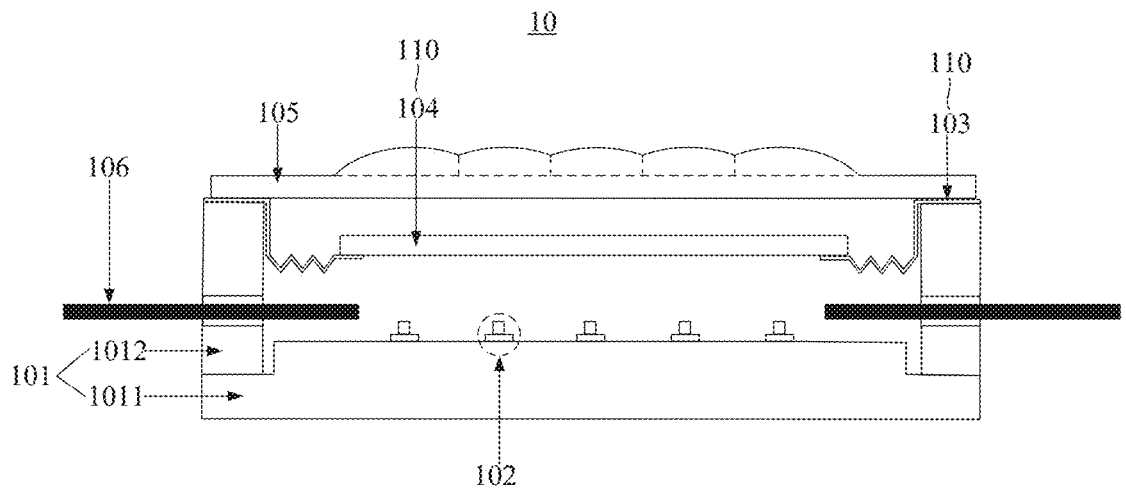
FIG. 3 is a structural diagram of yet another laser device, in accordance with some embodiments.

FIG. 3 is a structural diagram of yet another laser device, in accordance with some embodiments. As shown in FIG. 3, on the basis of the laser shown in FIGS. 1 and 2, the laser device 10 further includes a collimating lens group 105 located on a side of the light-transmissive layer 104 away from the case 101. For example, an edge of the collimating lens group 105 may be overlapped with the outer edge portion W2 in the cover plate 103 and fixed to the outer edge portion W2 by an adhesive. Alternatively, the collimating lens group 105 is located between the cover plate 103 and the bottom plate 1011.

In this way, the frame body 1012 in the case 101 may support the collimating lens group 105, so as to improve the reliability of the collimating lens group 105.

The collimating lens group 105 is used to collimate the laser beams emitted by the plurality of light-emitting assemblies 102 and then the laser beams are emitted. The collimating lens group 105 includes a plurality of collimating lenses, and the plurality of collimating lenses correspond to the plurality of light-emitting assemblies 102. The laser beam emitted by the light-emitting assembly 102 is emitted to a corresponding collimating lens, and is then emitted after being collimated by the collimating lens.

It will be noted that, collimating a beam refers to converging a divergent beam, so that a divergence angle of the beam becomes smaller and the beam is more approximate to a parallel beam.

As shown in FIG. 3, a plurality of convex arc surfaces bent toward a side away from the bottom plate 1011 are provided on a side of the collimating lens group 105 away from the bottom plate 1011 of the case 101. A portion of the collimating lens group 105 where one convex arc surface is located serves as a collimating lens. Therefore, it may be considered that, the collimating lens group 105 includes a plurality of collimating lenses.

In some embodiments, the collimating lens is a plano-convex lens, and the collimating lens has a convex arc surface and a flat surface. The convex arc surface and the flat surface are two opposite surfaces, and the flat surface is parallel to the inner surface or the outer surface of the bottom plate 1011, and is disposed proximate to the bottom plate 1011. A convex arc surface contained in the collimating lens group 105 is a convex arc surface in a collimating lens.

Figure 4:
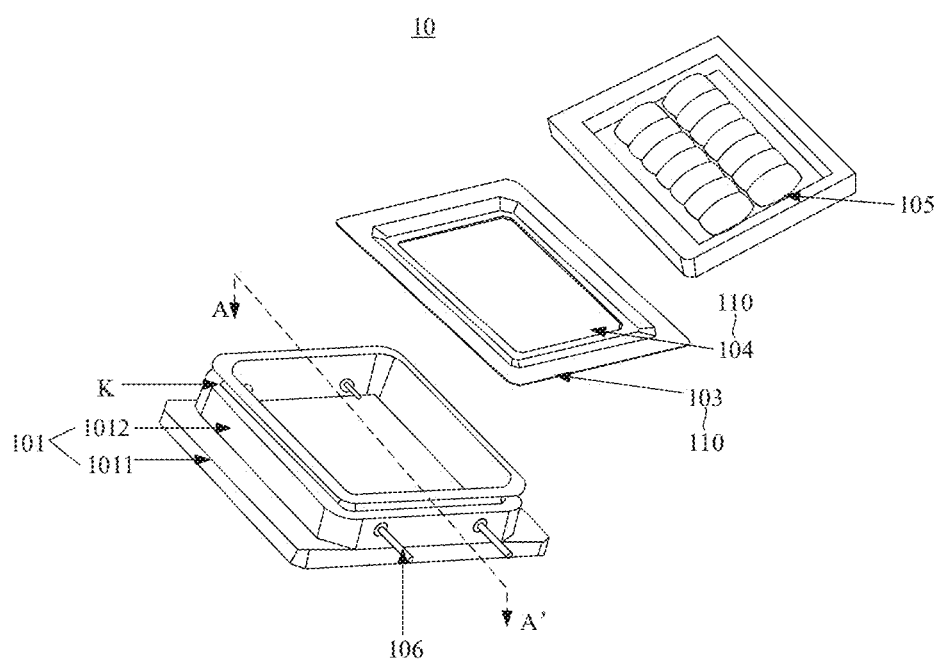
FIG. 4 is a structural diagram of yet another laser device, in accordance with some embodiments.
Figure 5:
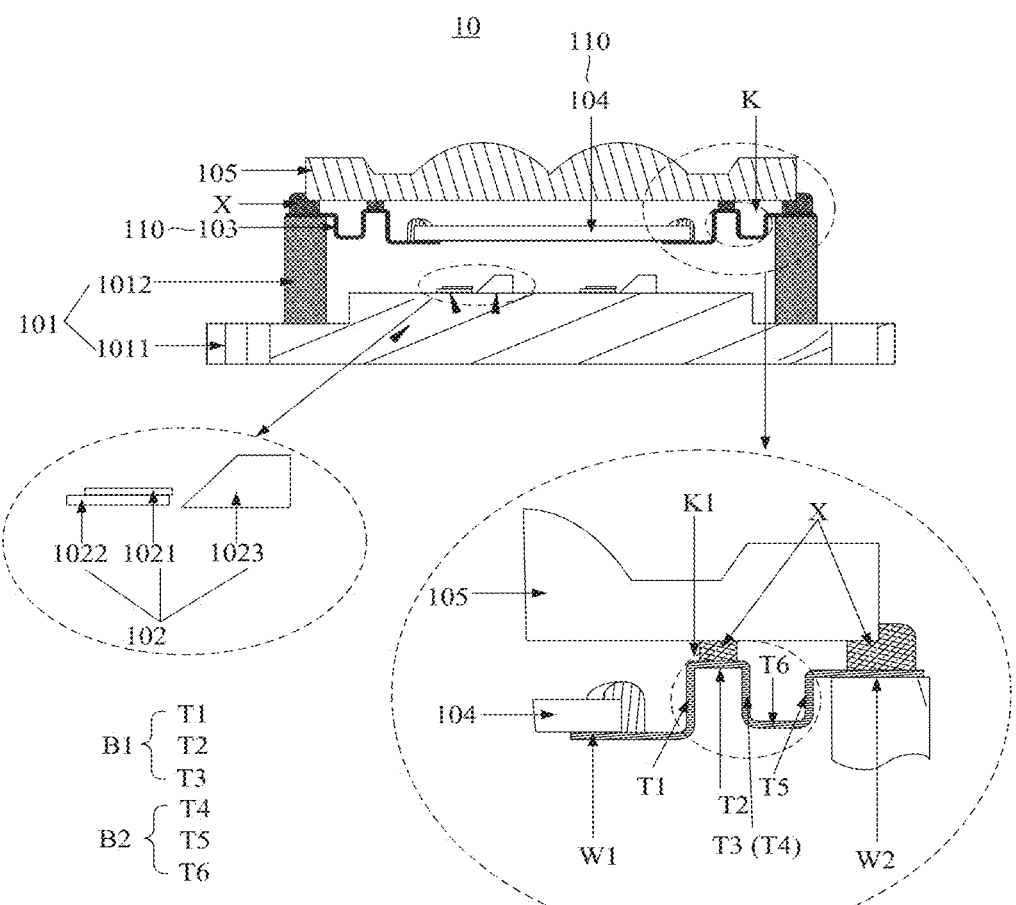
FIG. 5 is a sectional view of the laser device shown in FIG. 4.

FIG. 4 is a structural diagram of yet another laser device, in accordance with some embodiments, and FIG. 5 is a sectional view of the laser device shown in FIG. 4 taken along the line A-A'. Only differences between the laser device shown in FIGS. 4 and 5 and the laser device shown in FIG. 1 will be described below, and their similarities will not be repeated here. It will be noted that, components shown in FIGS. 4 and 5 that are the same as the components in the laser shown in FIG. 1 are represented by the same reference numerals as those shown in FIG. 1.

As shown in FIG. 5, the stress-offsetting structure K includes a first stress-offsetting structure K1, and the first stress-offsetting structure K1 connects the inner edge portion W1 and the outer edge portion W2. The first stress-offsetting structure K1 includes a plurality of second stress-offsetting sub-structures that are connected in sequence. As shown in FIG. 5, the second stress-offsetting sub-structure includes a first wall T1 or T4, a second wall T2 or T5, and a third wall T3 or T6 that are connected in sequence.

FIG. 5 shows two second stress-offsetting sub-structures as an example. One second stress-offsetting sub-structure is referred to as a first portion B1 (including the first wall T1, the second wall T2 and the third wall T3 that are connected in sequence), and the other second stress-offsetting sub-structure is referred to as a second portion B2 (including the first wall T4, the second wall T5 and the third wall T6 that are connected in sequence). The third wall T3 of the first portion B1 is the same as the first wall T4 of the second portion B2. The first portion B1 is connected to the inner edge portion W1, and the second portion B2 is connected to the outer edge portion W2.

As shown in FIG. 5, in some embodiments, an opening of the first portion B1 faces the bottom plate 1011, and an opening of the second portion B2 faces away from the bottom plate 1011. That is, the first portion B1 is raised in a direction away from the bottom plate 1011 relative to the inner edge portion W1, and the second portion B2 is recessed in a direction proximate to the bottom plate 1011 relative to the first portion B1. Therefore, the first stress-offsetting structure K1 has a plurality of bending positions, and when the case 101 and the cover plate 103 are thermally expanded, the first stress-offsetting structure K1 may be deformed to a certain extent at each bending position, so as to partially absorb the stress, thereby reducing the stress transmitted from the cover plate 103 to the light-transmissive layer 104 and the collimating lens group 105.

In some embodiments, a chamfered corner or a rounded corner may exist at a junction of the inner edge portion W1 and the first portion B1, junctions of the walls of the first portion B1, a junction of the first portion B1 and the second portion B2, junctions of the walls of the second portion B2 and a junction of the second portion B2 and the outer edge portion W2, so as to avoid breakage of the first portion B1 and/or the second portion B2 caused by excessive stress concentration at bending positions.

The first wall T1 of the first portion B1 is perpendicular to the second wall T2 of the first portion B1, and the second wall T2 of the first portion B1 is perpendicular to the third wall T3 of the first portion B1. The first wall T4 of the second portion B2 is perpendicular to the second wall T5 of the second portion B2, and the second wall T5 of the second portion B2 is perpendicular to the third wall T6 of the second portion B2. In this way, the first stress-offsetting structure K1 may be easily deformed to a certain extent at each bending position thereof.

However, it is not limited to this, the first wall T1 of the first portion B1 may be obliquely arranged with the second wall T2 of the first portion B1, and the second wall T2 of the first portion B1 may be obliquely arranged with the third wall T3 of the first portion B1. The first wall T4 of the second portion B2 may be obliquely arranged with the second wall T5 of the second portion B2, and the second wall T5 of the second portion B2 may be obliquely arranged with the third wall T6 of the second portion B2. In this case, an included angle between the first wall T1 and the second wall T2 of the first portion B1 is an acute angle, and an included angle between the second wall T2 and the third wall T3 of the first portion B1 is an acute angle. An included angle between the first wall T4 and the second wall T5 of the second portion B2 is an acute angle, and an included angle between the second wall T5 and the third wall T6 of the second portion B2 is an acute angle. In this way, the first stress-offsetting structure K1 may be easily deformed to a certain extent at each bending position thereof.

In some embodiments, the first stress-offsetting structure K1 includes a plurality of first portions B1 and a plurality of second portions B2, and the plurality of first portions B1 and the plurality of second portions B2 are alternately arranged between the inner edge portion W1 and the outer edge portion W2.

In some embodiments, the outer edge portion W2 is fixed to the collimating lens group 105 through an adhesive X. For example, as shown in FIG. 5, the outer edge portion W2 is bonded to the collimating lens group 105 through the adhesive X, and the first portion B1 in the first stress-offsetting structure K1 is bonded to the collimating lens group 105 through the adhesive X; a gap is formed on the second portion B2 between the adhesive X located on the outer edge portion W2 and the adhesive X located on the first portion B1, for example, the adhesive X is not provided between the second portion B2 and the collimating lens group 105.

Alternatively, only the outer edge portion W2 is bonded to the collimating lens group 105 through the adhesive X, the first portion B1 and the second portion B2 are not bonded with the collimating lens group 105. It will be noted that, the adhesive X may partially leak to other portions (such as the first portion B1 and/or the second portion B2) due to reasons such as operation accuracy.

As shown in FIG. 5, a width of the first portion B1 is less than a width of the outer edge portion W2, and a distance between a surface of the first portion B1 away from the bottom plate 1011 and a surface of the collimating lens group 105 proximate to the bottom plate 1011 is less than a distance between a surface of the outer edge portion W2 away from the bottom plate 1011 and the surface of the collimating lens group 105 proximate to the bottom plate 1011. For example, a distance between the surface of the first portion B1 away from the bottom plate 1011 and the surface of the outer edge portion W2 away from the bottom plate 1011 is in a range of less than 0.5 mm. For example, the distance is 0.1 mm, 0.2 mm, 0.3 mm, 0.4 mm, 0.45 mm or 0.5 mm.

Therefore, the distance between the surface of the first portion B1 away from the bottom plate 1011 and the surface of the collimating lens group 105 proximate to the bottom plate 1011 is relatively small, thus it is possible to make the first portion B1 bonded to the collimating lens group 105 by a small amount of adhesive X coated on the surface of the first portion B1 away from the bottom plate 1011, so as to avoid a situation where a large amount of adhesive X needs to be coated on the surface of the first portion B1 away from the bottom plate 1011 due to a large distance between the surface of the first portion B1 away from the bottom plate 1011 and the surface of the collimating lens group 105 proximate to the bottom plate 1011, thereby avoiding a situation where the adhesive X flows out from the first portion B1.

Alternatively, the surface of the first portion B1 away from the bottom plate 1011 is flush with the surface of the outer edge portion W2 away from the bottom plate 1011, so as to help coat the adhesive X on the first portion B1.

In some embodiments, as shown in FIG. 5, only an outer region of the outer edge portion W2 is coated with the adhesive X, so that the adhesive X located on the outer edge portion W2 may cover a side surface of the collimating lens group 105, thereby improving the bonding firmness of the collimating lens group 105. In addition, only the middle region of the first portion B1 is coated with the adhesive X, thus it is possible to prevent the adhesive X from flowing to a region other than the outer edge portion W2 and the first portion B1. Alternatively, the adhesive X may also be entirely coated on the outer edge portion W2 and the first portion B1 to an entire width thereof, which is not limited in the present disclosure.

In some embodiments, the adhesive X is coated on the outer edge portion W2 and the first portion B1 in a spot coating manner. For example, the adhesive X located on the outer edge portion W2 and the first portion B1 includes a plurality of adhesive blocks, and the plurality of adhesive blocks are uniformly distributed in each region of the outer edge portion W2 and the first portion B1. Alternatively, the plurality of adhesive blocks are distributed only on partial regions of the outer edge portion W2 and the first portion B1; for example, the plurality of adhesive blocks are distributed only on two opposite sides of the outer edge portion W2 and two opposite sides of the first portion B1.

In some embodiments, the adhesive X includes glass melt adhesive, low-temperature glass solder, epoxy glue, or other glues.

In the laser device 10 provided by some embodiments of the present disclosure, the collimating lens group 105 is supported by the outer edge portion W2 of the cover plate 103 and the first portion B1 in the first stress-offsetting structure K1, and the collimating lens group 105 is fixed by the adhesive X located on the outer edge portion W2 and the first portion B1, so that the collimating lens group 105 has a large bonding area and a large number of support points. Therefore, the bonding firmness of the collimating lens group 105 is improved, and the risk that the collimating lens group 105 is fallen off the cover plate 103 is reduced, thus the reliability of the laser device 10 is improved.

In addition, the light-emitting assembly 102 generates a large amount of heat during operation, and the heat may be conducted to the cover plate 103 through the case 101, and then conducted to the light-transmissive layer 104 and the collimating lens group 105 through the cover plate 103. Under the action of the heat, the case 101 and the cover plate 103 will be thermally expanded, thereby generating large stress. Since a gap exists between the adhesive X located on the outer edge portion W2 and the adhesive X located on the first portion B1, it is possible to avoid that the stress is continuously conducted through the adhesive X, and the stress may be released to a certain extent in the gap, so as to reduce the stress conducted to the light-transmissive layer 104 and the collimating lens group 105, and reduce the risk that the light-transmissive layer 104 and the collimating lens group 105 are broken or fallen off under the action of the stress, thereby improving the reliability of the laser device 10.

In some embodiments, when the outer edge portion W2 of the cover plate 103 and the case 101 are fixed by the parallel sealing technology, the cover plate 103 is placed on a side where the opening of the case 101 is located first, and the outer edge portion W2 of the cover plate 103 is lapped with the outer annular surface of the frame body 1012 of the case 101. Then, the outer edge portion W2 is heated by a sealing device, so that a connection position between the outer edge portion W2 and the frame body 1012 is melted, and then the outer edge portion W2 is welded and fixed to the frame body 1012 of the case 101.

As shown in FIG. 5, the second portion B2 is recessed in a direction proximate to the bottom plate 1011 relative to the outer edge portion W2. Since the sealing device needs to contact the outer edge portion W2 during the parallel sealing process, when the second portion B2 is recessed in the direction proximate to the bottom plate 1011 relative to the outer edge portion W2, there is a large distance between the outer edge portion W2 and the sealing device, thus it is possible to prevent the sealing device from affecting or breaking the outer edge portion W2.

When the cover plate 103 is fixed to the light-transmissive layer 104, the inner edge portion W1 of the cover plate 103 first needs to be coated with the adhesive, so that the light-transmissive layer 104 covers the inner edge portion W1, and an edge of the light-transmissive layer 104 is in close contact with the adhesive. The first portion B1 is connected to the inner edge portion W1, and the first portion B1 is raised in the direction away from the bottom plate 1011 relative to the inner edge portion W1, a height difference between the first portion B1 and the inner edge portion W1 may make the adhesive located only on the inner edge portion W1, so as to prevent the adhesive from flowing to other positions.

As shown in FIG. 5, a distance between a surface of the second portion B2 proximate to the bottom plate 1011 and the inner surface of the bottom plate 1011 is greater than a distance between a surface of the inner edge portion W1 proximate to the bottom plate 1011 and the inner surface of the bottom plate 1011. In this case, a distance between the surface of the second portion B2 proximate to the bottom plate 1011 and a surface of the first portion B1 proximate to the collimating lens group 105 is smaller, so that the first portion B1 and the second portion B2 may be more easily deformed at a connection position therebetween, and an effect of absorbing stress is better. However, it is not limited to this, the distance between the surface of the second portion B2 proximate to the bottom plate 1011 and the inner surface of the bottom plate 1011 is less than or equal to the distance between a surface of the inner edge portion W1 proximate to the bottom plate 1011 and the inner surface of the bottom plate 1011.

As shown in FIG. 5, the collimating lens group 105 is located on a side of the cover plate 103 away from the case 101. For example, the edge of the collimating lens group 105 is bonded to the outer edge portion W2 of the cover plate 103 through the adhesive X, and is bonded to the first portion B1 through the adhesive X.

In some embodiments, after the cover plate 103 is fixed to the case 101, the collimating lens group 105 is suspended in the air, and the plurality of light-emitting assemblies 102 are lit to adjust a light collimation effect of the collimating lens group 105. After adjusting and determining a position of the collimating lens group 105, the adhesive X is coated on the outer edge portion W2 and the first portion B1 of the cover plate 103, and then the collimating lens group 105 is fixed to the cover plate 103 through the adhesive X.

Since the position of the collimating lens group 105 may be adjusted, even if the frame body 1012 in the case 101 is slightly deformed due to the heat generated during brazing or parallel sealing, it is possible to reduce or eliminate an effect on emission of laser beams of the plurality of light-emitting assemblies 102 when the frame body 1012 is deformed by adjusting the position of the collimating lens group 105, so as to realize normal emission of laser beams of the laser device 10.

Figure 6:
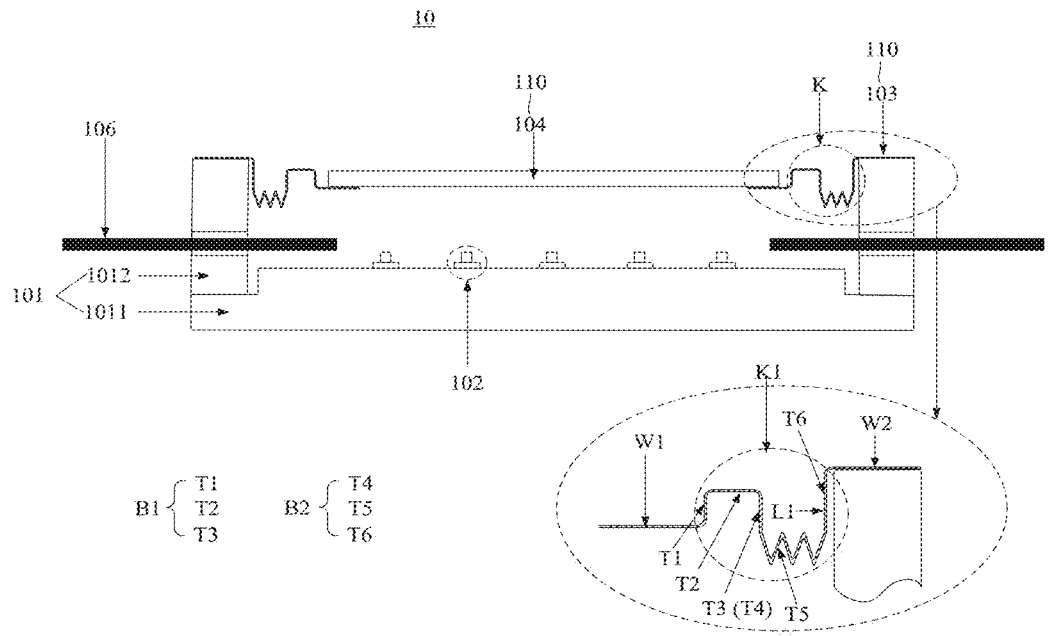
FIG. 6 is a structural diagram of yet another laser device, in accordance with some embodiments.

FIG. 6 is a structural diagram of yet another laser device, in accordance with some embodiments; only differences between the laser device shown in FIG. 6 and the laser device shown in FIG. 5 will be described below, and their similarities will not be repeated herein. It will be noted that, components in FIG. 6 that are the same as the components in the laser device as shown in FIG. 5 are represented by the same reference numerals as those shown in FIG. 5. In some embodiments, as shown in FIG. 6, the first stress-offsetting structure K1 in the laser device 10 is located between the inner edge portion W1 and the outer edge portion W2, and includes both the first stress-offsetting sub-structure and the second stress-offsetting sub-structure.

As shown in FIG. 6, in an example where two second stress-offsetting sub-structures are shown, one second stress-offsetting sub-structure is referred to as a first portion B1, and the other second stress-offsetting sub-structure is referred to as a second portion B2. The first portion B1 is connected to the inner edge portion W1, and the second portion B2 is connected to the outer edge portion W2. The second portion B2 of the second stress-offsetting sub-structure includes three first stress-offsetting sub-structures that are connected in sequence. For example, the second wall T5 of the second portion includes three first stress-offsetting sub-structures. As for the first stress-offsetting sub-structure, reference may be made to the description of FIGS. 1 and 2 above, and details will not be repeated herein.

Since the second portion B2 in the second stress-offsetting sub-structure includes three first stress-offsetting sub-structures that are connected in sequence, the first stress-offsetting structure K1 has a plurality of bending positions. under an action of the heat generated by the parallel sealing or the heat generated when the light-emitting assemblies 102 are in operation, the first stress-offsetting structure K1 will be deformed to a certain extent at each bending position, so as to absorb the stress generated by the cover plate 103 and the case 101 due to the heat, thereby reducing the stress transmitted to the light-transmissive layer 104, and reducing the risk that the light-transmitting layer 104 is broken or fallen off during the parallel sealing process.

In addition, since an expanded area of the first stress-offsetting structure K1 in FIG. 6 is greater than an expanded area of the first stress-offsetting structure K1 in FIG. 5, a stress absorption effect and a heat dissipation effect of the first stress-offsetting structure K1 in FIG. 6 are also better, which further improves the reliability of the laser device 10.

Furthermore, since the first portion B1 is raised in a direction away from the bottom plate 1011 relative to the inner edge portion W1, the outer edge portion W2 and the first portion B1 in the first stress-offsetting structure K1 may be coated with the adhesive, and the collimating lens group 105 is fixed by the adhesive located on the outer edge portion W2 and the first portion B1, so that the collimating lens group 105 has a large bonding area and a large number of support points. Therefore, the bonding firmness of the collimating lens group 105 is improved, and the risk that the collimating lens group 105 is fallen off the cover plate 103 is reduced, thereby improving the reliability of the laser device 10.

The light-emitting assembly 102 generates a large amount of heat during operation, and the heat may be conducted to the cover plate 103 through the case 101, and then conducted to the light-transmissive layer 104 and the collimating lens group 105 through the cover plate 103. The case 101 and the cover plate 103 will be thermally expanded under the action of the heat, thereby generating large stress. Since a gap exists between the adhesive located on the outer edge portion W2 and the adhesive located on the first portion B1, it is possible to avoid that the stress is continuously conducted through the adhesive, and the stress may be released to a certain extent at the gap, so as to reduce the stress conducted to the light-transmissive layer 104 and the collimating lens group 105, and reduce the risk that the light-transmissive layer 104 and the collimating lens group 105 are broken or fallen off under the action of the stress, thereby improving the reliability of the laser device 10.

The laser device 10 in which the stress-offsetting structure K is disposed in the case 101 will be described in detail below with reference to the accompanying drawings.

Only differences between the laser device shown in FIGS. 7 and 8 (FIG. 7 is a sectional view of the laser shown in FIG. 8 taken along the line B-B') and the laser device shown in FIGS. 1 and 2 will be described below, and their similarities will not be repeated herein. It will be noted that, components in FIGS. 7 and 8 that are the same as the components in the laser shown in FIGS. 1 and 2 are represented by the same reference numerals as those shown in FIGS. 1 and 2. As shown in FIGS. 7 and 8, the stress-offsetting structure K includes a second stress-offsetting structure K2 (referring to FIG. 7); the second stress-offsetting structure K2 is disposed on an inner wall or an outer wall at an end of the frame body 1012 in the case 101 away from the bottom plate 1011, and the second stress-offsetting structure K2 extends in a circumferential direction of the frame body 1012. FIGS. 7 and 8 show an example where only the outer wall of the frame body 1012 is provided with the second stress-offsetting structure K2.

In some embodiments, only the inner wall of the frame body 1012 is provided with the second stress-offsetting structure K2, or both the outer wall and the inner wall of the frame body 1012 are provided with the second stress-offsetting structure K2, which is not limited in the present disclosure.

As shown in FIG. 7, the light-emitting assembly 102 includes a light-emitting chip 1021, a heat sink 1022 and a reflecting prism 1023. The heat sink 1022 is fixed on the bottom plate 1011 of the case 101, and the light-emitting chip 1021 is fixed on the heat sink 1022, and the reflecting prism 1023 is located on a light exit side of the light-emitting chip 1021.

The light-emitting chip 1021 emits a laser beam to the reflecting prism 1023, and the reflecting prism 1023 reflects the incident laser beam in a direction away from the bottom plate 1011. The laser beam may transmit through the light-transmissive layer 104, so as to realize the light-emission of the laser device.

The heat sink 1022 is used to assist in dissipating the heat generated by the light-emitting chip 1021 when the light-emitting chip 1021 emits the laser beam. The light-emitting chip 1021 generates a large amount of heat when emitting the laser beam, and the heat may be conducted to the bottom plate 1011 of the case 101 through the heat sink 1022, and then conducted to the cover plate 103 through the frame body 1012 of the case 101, so as to avoid a damage to the light-emitting chip 1021 caused by heat accumulation.

In some embodiments, as shown in FIG. 7, a distance between adjacent light-emitting chips in a first direction E (such as a light exit direction of the light-emitting chip 1021) is in a range from 2 to 4 mm. For example, the distance is 2 mm, 3 mm or 4 mm. In a second direction F perpendicular to the first direction E, the distance between adjacent light-emitting chips is in a range from 3 to 6 mm. For example, the distance is 3 mm, 4 mm, 5 mm or 6 mm. In this arrangement, there is a certain distance between the adjacent light-emitting chips, so as to prevent the heat generated by the plurality of light-emitting chips from accumulating due to an excessive density of the plurality of light-emitting chips, thereby preventing the accumulated heat from causing damage to the laser device 10.

It will be noted that, the structure and connection relationship of the light-emitting assembly 102 shown in FIG. 7 may also be applied to the laser devices shown in FIGS. 1 to 6.

As shown in FIG. 7, the cover plate 103 includes the inner edge portion W1 and the outer edge portion W2, and does not include the first stress-offsetting structure K1 shown in FIG. 1. The outer edge portion W2 is fixed on the outer annular surface of the frame body 1012 by the parallel sealing technology. The inner edge portion W1 is recessed in a direction proximate to the bottom plate 1011 relative to the outer edge portion W2. However, it is not limited to this, the cover plate 103 shown in FIG. 7 may also include the first stress-offsetting structure K1 shown in FIG. 1.

When the parallel sealing is performed on the cover plate 103, the case 101 and the cover plate 103 will be thermally expanded, thereby generating large stress. Since a thickness of the frame body 1012 at a position where the second stress-offsetting structure K2 is located is relatively small, the frame body 1012 is easily deformed at the position where the second stress-offsetting structure K2 is located under an action of the stress. For example, the frame body 1012 becomes uneven at the position, and the deformation amount is small. In this way, the stress may be converted into mechanical force, so as to achieve an effect of absorbing stress, so that the stress transmitted to the light-transmissive layer 104 is small.

In some embodiments, the second stress-offsetting structure K2 includes a groove, and the groove includes two side surfaces K21 and K22 and a groove surface K23 connecting the two side surfaces. The groove surface K23 is a curved surface or a flat surface.

However, it is not limited to this, and the groove in the second stress-offsetting structure K2 may also be an arc-shaped groove. In this case, the groove includes only the groove surface.

It will be noted that, FIGS. 7 and 8 both show an example where the groove surface K23 in the second stress-offsetting structure K2 is a flat surface. In some embodiments, as shown in FIG. 7, a wall thickness d2 of the frame body 1012 at the position where the second stress-offsetting structure K2 is located is less than or equal to 0.6 mm. For example, the wall thickness is 0.1 mm, 0.2 mm, 0.25 mm, 0.3 mm, 0.4 mm, 0.5 mm or 0.6 mm. It will be noted that, the wall thickness d2 of the frame body 1012 at the position where the second stress-offsetting structure K2 is located includes a minimum wall thickness of the frame body 1012 at the position where the second stress-offsetting structure K2 is located.

In a case where the groove surface K23 is a flat surface, the wall thickness d2 of the frame body 1012 at each position where the second stress-offsetting structure K2 is located is the same; in a case where the groove surface K23 is a curved surface, the groove surface K23 is not parallel to the inner wall of the frame body 1012, then the wall thickness d2 of the frame body 1012 at each position where the second stress-offsetting structure K2 is located is different.

In some embodiments of the present disclosure, regardless of whether the wall thickness of the frame body 1012 at each position where the second stress-offsetting structure K2 is located is the same, the wall thickness of the frame body 1012 at each position may be less than or equal to 0.6 mm. In this way, the wall thickness of the frame body 1012 at the position where the second stress-offsetting structure K2 is located may be reduced. When the case 101 is thermally expanded and generates stress, the frame body 1012 at the position where the second stress-offsetting structure K2 is located may be easily deformed under the action of the stress, so as to achieve the effect of absorbing stress.

In some embodiments, the second stress-offsetting structure K2 surrounds an entire annular surface of the frame body 1012. In some other embodiments, the frame body 1012 has a plurality of second stress-offsetting structures K2, and the plurality of second stress-offsetting structures K2 all surround the entire annular surface of the frame body 1012. For example, the plurality of second stress-offsetting structures K2 are arranged on the frame body 1012 in sequence in a direction away from the bottom plate 1011. By providing more second stress-offsetting structures K2, the effect of absorbing stress of the laser device 10 may be enhanced.

In yet some other embodiments, the frame body 1012 has a plurality of second stress-offsetting structures K2, but the plurality of second stress-offsetting structures K2 do not surround the entire annular surface of the frame body 1012, and extend along one side wall of the frame body 1012. The plurality of second stress-offsetting structures K2 may be distributed in different side walls of the frame body 1012. For example, in a case where the frame body 1012 is in a shape of a square ring, the frame body 1012 has four second stress-offsetting structures K2 respectively located in four side walls of the frame body 1012. A length of the second stress-offsetting structure K2 is less than or equal to a length of the side wall of the frame body 1012 where the second stress-offsetting structure K2 is located. In this way, a structural strength of the frame body 1012 may be ensured at the position where every two adjacent side walls of the frame body 1012 are connected.

In some embodiments, among the plurality of second stress-offsetting structures K2, a part of the second stress-offsetting structures K2 is located on the outer wall of the frame body 1012, and another part of the second stress-offsetting structures K2 is located on the inner wall of the frame body 1012; or, the plurality of second stress-offsetting structures K2 are all located on the inner wall (or the outer wall) of the frame body 1012, which is not limited in the present disclosure.

In some embodiments, an orthogonal projection of an edge of the outer edge portion W2 on the bottom plate 1011 is located within an orthogonal projection of the outer annular surface of the frame body 1012 on the bottom plate 1011, that is, the edge of the outer edge portion W2 is retracted relative to an edge of the outer annular surface of the frame body 1012. This arrangement has the same effect as those described above, and details will not be described herein again.

In some embodiments, as shown in FIG. 7, a distance d3 between the outer annular surface of the frame body 1012 and the second stress-offsetting structure K2 is less than or equal to 0.6 mm. For example, the distance is 0.1 mm, 0.2 mm, 0.25 mm, 0.3 mm, 0.4 mm, 0.5 mm or 0.6 mm. The outer annular surface is also the surface fixed to the outer edge portion W2 of the cover plate 103. Therefore, the distance d3 between the outer annular surface of the frame body 1012 and the second stress-offsetting structure K2 is equal to the wall thickness d2 of the frame body 1012 at each position where the second stress-offsetting structure K2 is located, so that the structures around the second stress-offsetting structure K2 have approximately the same ability of absorbing stress. Furthermore, it is possible to avoid that the frame body 1012 is partially deformed as the structures around the second stress-offsetting structure K2 have different abilities of absorbing stress. It will be noted that, the distance between the outer annular surface and the second stress-offsetting structure K2 includes a minimum distance between each position of the outer annular surface and the second stress-offsetting structure K2 in a direction perpendicular to the bottom plate 1011.

When the outer edge portion W2 of the cover plate 103 is fixed to the frame body 1012 in the case 101 by using the sealing device, a connection position of the outer edge portion W2 and the frame body 1012 needs to be melted. Under normal circumstances, the frame body in the case is of an annular structure with a flat inner wall and a flat outer wall, and a height of the frame body is relatively large, therefore, a melting rate of the frame body under an action of the sealing device is relatively slow, the frame body has great difficulty in being melted.

In the laser device 10 provided by some embodiments of the present disclosure, the distance d3 between the outer annular surface of the frame body 1012 and the second stress-offsetting structure K2 is small, therefore, a thickness of the frame body 1012 at a position located between the outer annular surface and the second stress-offsetting structure K2 in the direction perpendicular to the bottom plate 1011 is small, thus the portion may be easily melted under the action of the sealing device, and the melting rate is fast, so as to improve an efficiency of sealing the cover plate 103, and improve the welding firmness between the cover plate 103 and the frame body 1012.

Figure 9:
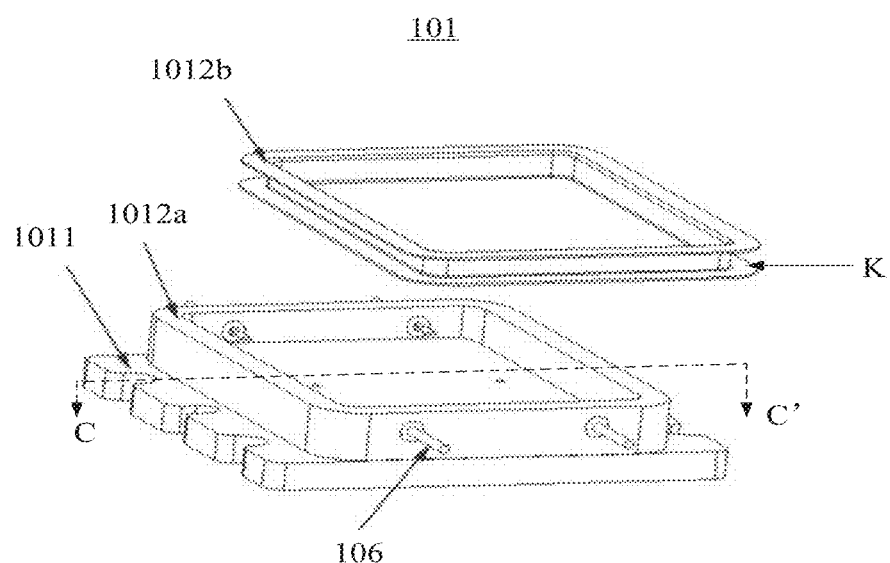
FIG. 9 is a structural diagram of yet another laser device, in accordance with some embodiments.
Figure 10:
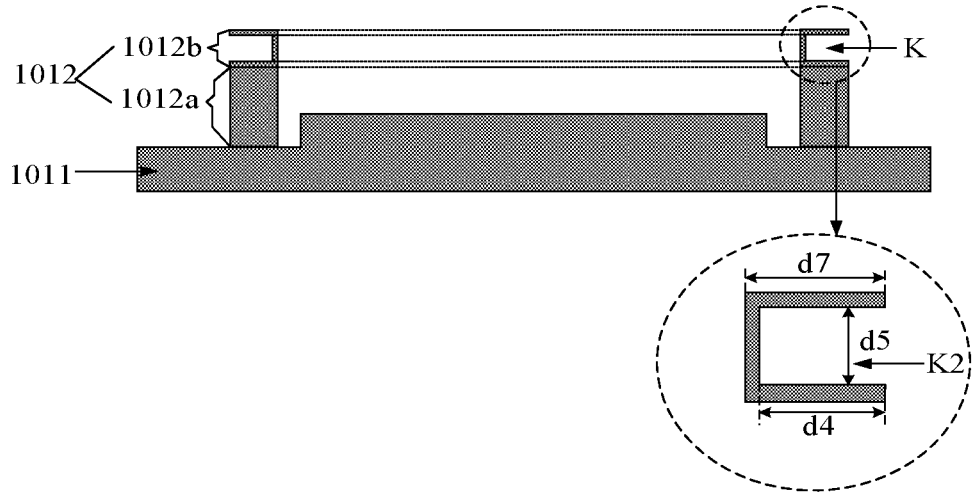
FIG. 10 is a sectional view of the laser device shown in FIG. 9.

FIG. 9 is a structural diagram of yet another laser device, in accordance with some embodiments, and FIG. 10 is a sectional view of the laser device shown in FIG. 9 taken along the line C-C'. Only differences between the laser device shown in FIGS. 9 and 10 and the laser device shown in FIGS. 7 and 8 will be described below, and their similarities will not be repeated herein. It will be noted that, components in FIGS. 9 and 10 that are the same as the components in the laser device shown in FIGS. 7 and 8 are represented by the same reference numerals as those shown in FIGS. 7 and 8. In some embodiments, as shown in FIGS. 9 and 10, the frame body 1012 includes a main body 1012a and a groove portion 1012b. The main body 1012a is fixed on the bottom plate 1011, and the groove portion 1012b is fixed on a surface of the main body 1012a away from the bottom plate 1011.

The main body 1012a is an annular structure with a flat inner wall and a flat outer wall, and the groove portion 1012b has a second stress-offsetting structure K2. That is, the groove portion 1012b is an end of the frame body 1012 away from the bottom plate 1011, and the second stress-offsetting structure K2 contained in the groove portion 1012b is the second stress-offsetting structure K2 contained in the frame body 1012. As for a structure and function of the second stress-offsetting structure K2 of the groove portion 1012b, reference may be made to the second stress-offsetting structure K2 shown in FIGS. 7 and 8, and details will not be repeated herein.

It will be noted that, materials of the main body 1012a and the groove portion 1012b may be the same or different, which is not limited in the present disclosure.

In some embodiments, the groove portion 1012b is fixed to the surface of the main body 1012a away from the bottom plate 1011 by brazing.

In some embodiments, a shape of a surface of the main body 1012a away from the bottom plate 1011 is the same as a shape of a surface of the groove portion 1012b proximate to the bottom plate 1011, and an orthogonal projection of the main body 1012a on the bottom plate 1011 coincides with an orthogonal projection of the groove portion 1012b on the bottom plate 1011.

Figure 11:
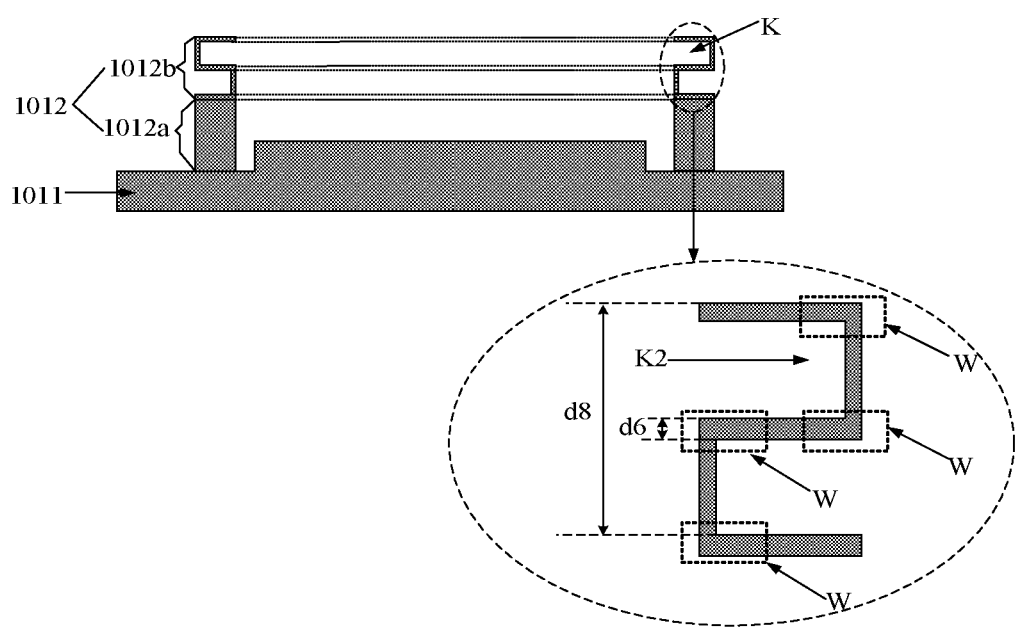
FIG. 11 is a structural diagram of yet another laser device, in accordance with some embodiments.

FIG. 11 is a structural diagram of yet another laser device, in accordance with some embodiments; only differences between the laser device shown in FIG. 11 and the laser device shown in FIG. 10 will be described below, and their similarities will not be repeated herein. It will be noted that, components in FIG. 11 that are the same as the components in the laser device shown in FIG. 10 are represented by the same reference numerals as those shown in FIG. 10. In some embodiments, as shown in FIG. 11, the groove portion 1012b includes two second stress-offsetting structures K2, that is, a second stress-offsetting structure K2 is respectively provided on an inner wall and an outer wall of the frame body groove portion 1012b, and opening directions of the two second stress-offsetting structures K2 are opposite. For example, an opening of one second stress-offsetting structures K2 faces the inside of the case 101, and an opening of the other second stress-offsetting structures K2 faces the outside of the case 101.

In a case where the groove portion 1012b includes a plurality of second stress-offsetting structures K2, the plurality of second stress-offsetting structures K2 may be alternately arranged on the inner wall and the outer wall of the groove portion 1012b in the direction perpendicular to the bottom plate 1011.

In some embodiments, the plurality of second stress-offsetting structures K2 are of a same size or difference sizes, which is not limited in the present disclosure.

In some embodiments, as shown in FIG. 11, in a case where the groove portion 1012b has a plurality of second stress-offsetting structures K2 arranged in sequence in the direction perpendicular to the bottom plate, the groove portion 1012b also has a plurality of bending structures W. In this manner, when the frame body 1012 is thermally expanded and generates stress, each bending structure W of the plurality of bending structures W may be deformed to a certain extent in a corresponding bending direction, so as to further enhance the effect of absorbing stress.

FIG. 11 shows an example where the plurality of bending structures W each have a right angle at a bending position in the case 101 provided by some embodiments of the present disclosure. In some embodiments, the bending structure W at the bending position has a chamfered or rounded corner, so as to avoid a damage to the groove portion 1012b due to excessive stress concentration at the bending position.

In some embodiments, as shown in FIG. 11, the size of the second stress-offsetting structure K2 includes a depth and a width of the second stress-offsetting structure K2, and the depth d4 (referring to FIG. 10) of the second stress-offsetting structure K2 is a distance between a plane where the opening of the second stress-offsetting structure K2 is located and the groove surface of the second stress-offsetting structure K2; or, the depth d4 of the second stress-offsetting structure K2 is a difference between a maximum thickness d7 (referring to FIG. 10) of the frame body 1012 and the wall thickness d2 (referring to FIG. 7) of the frame body 1012 at the position where the second stress-offsetting structure K2 is located, and the width d5 (referring to FIG. 10) of the second stress-offsetting structure K2 is a distance between two side surfaces of the second stress-offsetting structure K2 in the direction perpendicular to the bottom plate 1011.

For example, the maximum thickness d7 of the frame body 1012 may be in a range from 1.2 mm to 2.5 mm. For example, the maximum thickness d7 is 1.2 mm, 1.3 mm, 1.4 mm, 1.5 mm, 2.0 mm, 2.1 mm, 2.3 mm or 2.5 mm.

In some embodiments, since the wall thickness d2 of the frame body 1012 at the position where the second stress-offsetting structure K2 is located is less than or equal to 0.6 mm, the depth d4 of the second stress-offsetting structure K2 is in a rage from 0.6 mm to 1.9 mm. For example, the depth d4 may be 0.6 mm, 0.8 mm, 1.0 mm, 1.3 mm, 1.6 mm or 1.9 mm.

In some embodiments, as shown in FIG. 11, a length d8 of the groove portion 1012b in the direction perpendicular to the bottom plate 1011 is in a range from 0.6 mm to 4 mm. For example, the length d8 is 0.6 mm, 0.7 mm, 0.8 mm, 0.9 mm, 1.0 mm, 1.5 mm, 2 mm, 3 mm or 4 mm.

It will be noted that, in the laser device 10 provided by some embodiments of the present disclosure, the length d8 of the frame body 1012 at the position where the plurality of second stress-offsetting structures K2 are located (that is, a portion with a small wall thickness of the frame body 1012) in the direction perpendicular to the bottom plate 1011 is relatively small, therefore, the frame body 1012 still has a relatively high strength, so that the frame body 1012 may protect various components disposed inside the case 101.

In the laser device 10 provided by some embodiments of the present disclosure, a number of the second stress-offsetting structures K2 contained in the frame body 1012 may be one, or may be two, three or even more. Therefore, the maximum width d5 of the second stress-offsetting structure K2 is in a range of less than 4 mm. For example, the width d5 is 1.0 mm, 1.5 mm, 2 mm, 3 mm or 4 mm.

In some embodiments, as shown in FIG. 11, a distance d6 between two adjacent second stress-offsetting structures K2 in the plurality of second stress-offsetting structures K2 contained in the frame body 1012 is less than or equal to 0.6 mm. For example, the distance d6 may be equal to the wall thickness d2 of the frame body 1012 at the position where the second stress-offsetting structure K2 is located, and the distance d6 is 0.1 mm, 0.2 mm, 0.3 mm, 0.4 mm, 0.5 mm or 0.6 mm.

In a case where the frame body 1012 has a plurality of second stress-offsetting structures K2, the width d5 of each second stress-offsetting structure K2 may be designed according to the number of the plurality of second stress-offsetting structures K2. For example, in a case where the frame body 1012 has a plurality of second stress-offsetting structures K2, the width d5 of each second stress-offsetting structure K2 is the same, and the distance d6 between each two adjacent second stress-offsetting structures K2 is the same, and the distance d6 is equal to the distance d3 (referring to FIG. 7) between the outer annular surface of the frame body 1012 and the second stress-offsetting structure K2. In this case, the width d5 of each second stress-offsetting structure K2 is equal to a difference between the length d8 of the plurality of second stress-offsetting structures K2 in the frame body 1012 in the direction perpendicular to the bottom plate 1011 and n multiplied the distance d6 between adjacent second stress-offsetting structures K2 (that is, n×d5=d8−n×d6), and n represents the number of the plurality of second stress-offsetting structures K2.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A laser device, comprising:
   a case, including:
      a bottom plate; and
      a frame body being disposed on the bottom plate and being enclosed on the bottom plate to form an accommodating space with an opening;
   a plurality of light-emitting assemblies located in the accommodating space and disposed on the bottom plate;
   an upper cover assembly being fixed to the case and covering the opening; and
   a stress-offsetting structure being disposed in the frame body and/or in the upper cover assembly, and being configured to be contracted in a squeezing direction when the stress-offsetting structure is squeezed;
   wherein the upper cover assembly includes a cover plate and a light-transmissive layer; the cover plate includes:
      an outer edge portion fixed to a surface of the frame body away from the bottom plate; and
      an inner edge portion fixed to the light-transmissive layer, and the inner edge portion being closer to the bottom plate than the outer edge portion;
   wherein the stress-offsetting structure is disposed between the outer edge portion and the inner edge portion, and connects the outer edge portion and the inner edge portion; and
   the stress-offsetting structure includes a plurality of first stress-offsetting sub-structures that are connected in sequence; at least one of the plurality of first stress-offsetting sub-structures includes a first plate and a second plate, and a side edge of the first plate is fixed to a side edge of the second plate, and an included angle is formed at a position where the first plate is fixed to the second plate.

2. The laser device according to claim 1, wherein in two first stress-offsetting sub-structures of the stress-offsetting structure, dimensions of the first plate and the second plate of one first stress-offsetting sub-structure are greater than dimensions of the first plate and the second plate of another first stress-offsetting sub-structure; or, the included angle between the first plate and the second plate of one first stress-offsetting sub-structure is greater than the included angle between the first plate and the second plate of another first stress-offsetting sub-structure.

3. The laser device according to claim 1, wherein the inner edge portion is closer to the bottom plate than the stress-offsetting structure;
   the stress-offsetting structure further includes a third plate; a side edge of the third plate is connected to the first plate of one first stress-offsetting sub-structure closest to the inner edge portion, and another opposite side edge of the third plate is connected to the inner edge portion.

4. The laser device according to claim 1, wherein the inner edge portion is directly connected to the first plate of one first stress-offsetting sub-structure closest to the inner edge portion.

5. The laser device according to claim 1, wherein the stress-offsetting structure includes a plurality of second stress-offsetting sub-structures that are connected in sequence; at least one of the plurality of second stress-offsetting sub-structures includes a first wall, a second wall and a third wall that are connected in sequence.

6. The laser device according to claim 5, wherein the first wall of the second stress-offsetting sub-structure is perpendicular to the second wall of the second stress-offsetting sub-structure, and the second wall of the second stress-offsetting sub-structure is perpendicular to the third wall of the second stress-offsetting sub-structure; or, the first wall of the second stress-offsetting sub-structure is obliquely arranged with the second wall of the second stress-offsetting sub-structure, and an included angle between the first wall and the second wall is an acute angle; the second wall of the second stress-offsetting sub-structure is obliquely arranged with the third wall of the second stress-offsetting sub-structure, and an included angle between the second wall and the third wall is an acute angle.

7. The laser device according to claim 5, wherein one second stress-offsetting sub-structure of the plurality of second stress-offsetting sub-structures is referred to as a first portion, and the first portion includes the first wall, the second wall and the third wall that are connected in sequence;

another second stress-offsetting sub-structure of the plurality of second stress-offsetting sub-structures is referred to as a second portion, and the second portion includes a first wall, a second wall and a third wall that are connected in sequence;

in a case where the first portion and is connected to the second portion, the third wall of the first portion and the first wall of the second portion are a same wall, or, the third wall of the second portion and the first wall of the first portion are a same wall.

8. The laser device according to claim 7, wherein an opening of the first portion faces the bottom plate and an opening of the second portion faces away from the bottom plate, so that the first portion is raised in a direction away from the bottom plate relative to the inner edge portion, and the second portion is recessed in a direction proximate to the bottom plate relative to the first portion; the first portion is connected to the inner edge portion of the cover plate, and the second portion is connected to the outer edge portion of the cover plate.

9. The laser device according to claim 7, further comprising a collimating lens group, wherein the collimating lens group is fixed to the first portion and the outer edge portion of the cover plate.

10. The laser device according to claim 9, wherein a distance between a surface of the first portion away from the bottom plate and a surface of the collimating lens group proximate to the bottom plate is less than a distance between a surface of the outer edge portion away from the bottom plate and the surface of the collimating lens group proximate to the bottom plate.

11. The laser device according to claim 9, wherein a distance between a surface of the second portion proximate to the bottom plate and the bottom plate is greater than a distance between a surface of the inner edge portion proximate to the bottom plate and the bottom plate.

12. The laser device according to claim 1, wherein the stress-offsetting structure includes a plurality of second stress-offsetting sub-structures that are connected in sequence, and at least one of the plurality of second stress-offsetting sub-structures includes a first wall, a second wall and a third wall that are connected in sequence;

the at least one second stress-offsetting sub-structure includes a plurality of first stress-offsetting sub-structures that are connected in sequence, and the plurality of first stress-offsetting sub-structures are located at the first wall, the second wall or the third wall; at least one of the plurality of first stress-offsetting sub-structures includes a first plate and a second plate, and a side edge of the first plate is fixed to a side edge of the second plate, and an included angle is formed at a position where the first plate is fixed to the second plate.

13. A laser projection apparatus, comprising:
a laser source including the laser device according to claim 1 and being configured to emit illumination beams;
an optical engine being configured to modulate the illumination beams emitted by the laser source to obtain projection beams; and
a projection lens being configured to project the projection beams into an image.

14. A laser device, comprising:
a case, including:
a bottom plate; and
a frame body being disposed on the bottom plate and being enclosed on the bottom plate to form an accommodating space with an opening;
a plurality of light-emitting assemblies located in the accommodating space and disposed on the bottom plate;
an upper cover assembly being fixed to the case and covering the opening; and
a stress-offsetting structure being disposed in the frame body and/or in the upper cover assembly, and being configured to be contracted in a squeezing direction when the stress-offsetting structure is squeezed;
wherein the stress-offsetting structure is disposed on an inner wall and/or an outer wall of a side of the frame body away from the bottom plate, and the stress-offsetting structure includes a groove.

15. The laser device according to claim 14, wherein the groove extends in a circumferential direction of the frame body to form an end-to-end ring or a non-end-to-end strip.

16. The laser device according to claim 14, wherein the stress-offsetting structure includes a plurality of grooves, and the plurality of grooves are alternately arranged on the inner wall and the outer wall of the frame body in a direction perpendicular to the bottom plate.

17. The laser device according to claim 14, wherein a distance between a surface of the frame body away from the bottom plate and the groove is equal to a wall thickness of the frame body at a position where the groove is located;
the wall thickness of the frame body at the position where the groove is located includes a minimum wall thickness of the frame body at the position where the groove is located.

18. The laser device according to claim 14, wherein the frame body includes a main body and a groove portion;
the main body is fixed on the bottom plate, and the groove portion is fixed on a surface of main body away from the bottom plate, and the groove is located in the groove portion.

19. A laser projection apparatus, comprising:
a laser source including the laser device according to claim 15 and being configured to emit illumination beams;
an optical engine being configured to modulate the illumination beams emitted by the laser source to obtain projection beams; and
a projection lens being configured to project the projection beams into an image.

* * * * *